US007337992B1

(12) United States Patent
Blatt

(10) Patent No.: US 7,337,992 B1
(45) Date of Patent: Mar. 4, 2008

(54) DISTRIBUTION ASSEMBLY FOR PARTICULATE MATERIAL

(76) Inventor: Michael S. Blatt, 5100 NE. 27th Ter., Lighthouse Point, FL (US) 33064

( * ) Notice: Subject to any disclaimer, the term of this patent is extended or adjusted under 35 U.S.C. 154(b) by 0 days.

(21) Appl. No.: 11/603,319

(22) Filed: Nov. 21, 2006

Related U.S. Application Data

(63) Continuation of application No. 10/793,655, filed on Mar. 3, 2004, now Pat. No. 7,137,579, which is a continuation-in-part of application No. 10/227,729, filed on Aug. 26, 2002, now Pat. No. 6,883,736.

(51) Int. Cl.
| | |
|---|---|
| A01C 15/04 | (2006.01) |
| B05B 7/14 | (2006.01) |
| E01C 19/20 | (2006.01) |
| B60P 1/60 | (2006.01) |
| B65G 53/40 | (2006.01) |

(52) U.S. Cl. .............. 239/654; 239/172; 239/650; 406/39; 406/122; 222/637

(58) Field of Classification Search .......... 239/654, 239/172, 650, 124, 126, 142, 143, 176, 302, 239/337, 340, 347, 379, 407, 578, 661, 663, 239/668, 674, 689, 722; 406/39, 122, 38, 406/40, 41–43, 127, 139, 144, 153; 222/637, 222/626

See application file for complete search history.

(56) References Cited

U.S. PATENT DOCUMENTS

| | | | | |
|---|---|---|---|---|
| 1,755,329 | A * | 4/1930 | McCormack | ............... 239/654 |
| 2,391,048 | A * | 12/1945 | Vose | ........................... 239/654 |
| 3,123,362 | A * | 3/1964 | Elvers | ......................... 239/654 |
| 3,174,251 | A * | 3/1965 | West | ........................... 239/655 |
| 3,206,255 | A * | 9/1965 | Gray | ........................... 406/93 |
| 4,249,839 | A * | 2/1981 | Vance | ......................... 406/109 |
| 4,387,852 | A * | 6/1983 | Mattson et al. | ............. 239/143 |
| 4,474,327 | A * | 10/1984 | Mattson et al. | ............. 239/143 |
| 4,630,929 | A * | 12/1986 | Medlin | ......................... 366/10 |
| 5,092,526 | A * | 3/1992 | Takata | ......................... 239/655 |
| 5,190,225 | A * | 3/1993 | Williams | ..................... 239/653 |
| 5,899,641 | A * | 5/1999 | Pfeiffer | ....................... 406/144 |
| 6,070,814 | A * | 6/2000 | Deitesfeld | ................... 239/654 |
| 6,343,897 | B1 * | 2/2002 | Cutler | ......................... 406/143 |
| 6,511,263 | B2 * | 1/2003 | Cutler | ........................... 406/2 |

* cited by examiner

*Primary Examiner*—Darren Gorman
(74) *Attorney, Agent, or Firm*—Malloy & Malloy, P.A.

(57) ABSTRACT

An assembly for distributing particulate material comprising a blower assembly preferably removably mounted on a mobile platform and structured to generate a forced flow of air along a flow path and through a manifold assembly connected to a supply of material being distributed. The manifold assembly includes a receiving segment incorporating a Venturi section facilitating the introduction of the particulate material into the forced air flow passing through a discharge conduit. The discharge conduit preferably has an extended length to facilitate distribution of the material to a plurality of locations in a variety of different environments. An applicator is selectively attached to the discharge conduit so as to facilitate distribution of the particulate material to a substantially confined space, such as a potted plant.

5 Claims, 19 Drawing Sheets

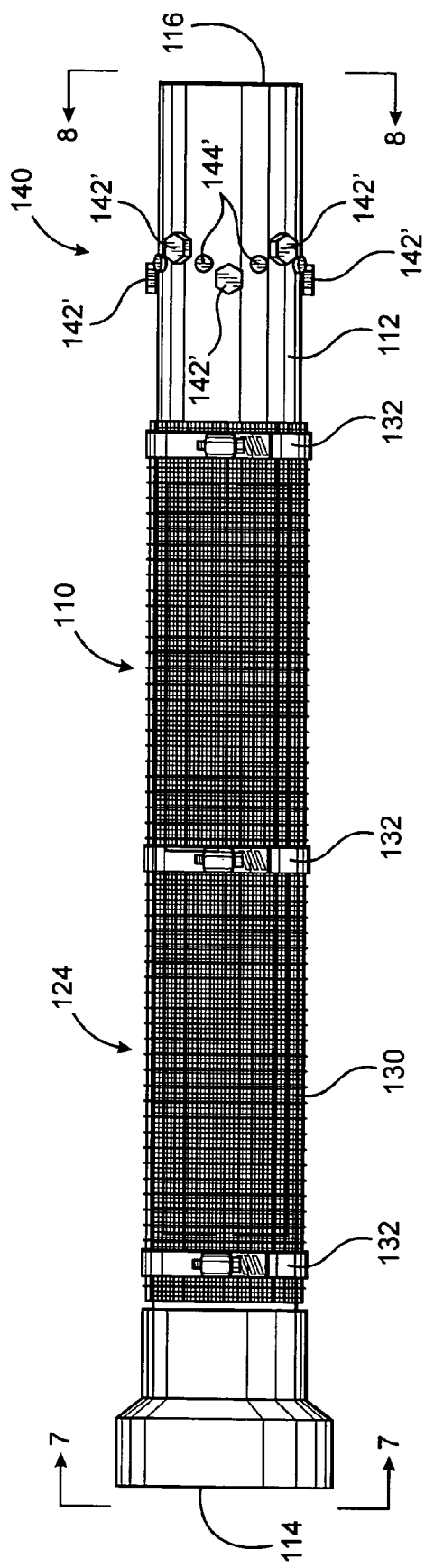
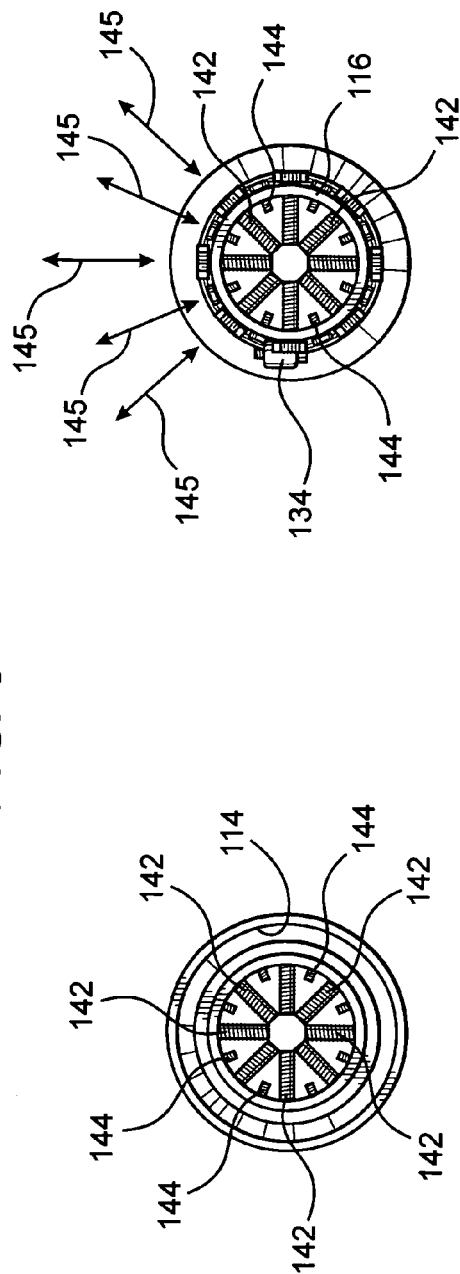
FIG. 6
FIG. 7
FIG. 8

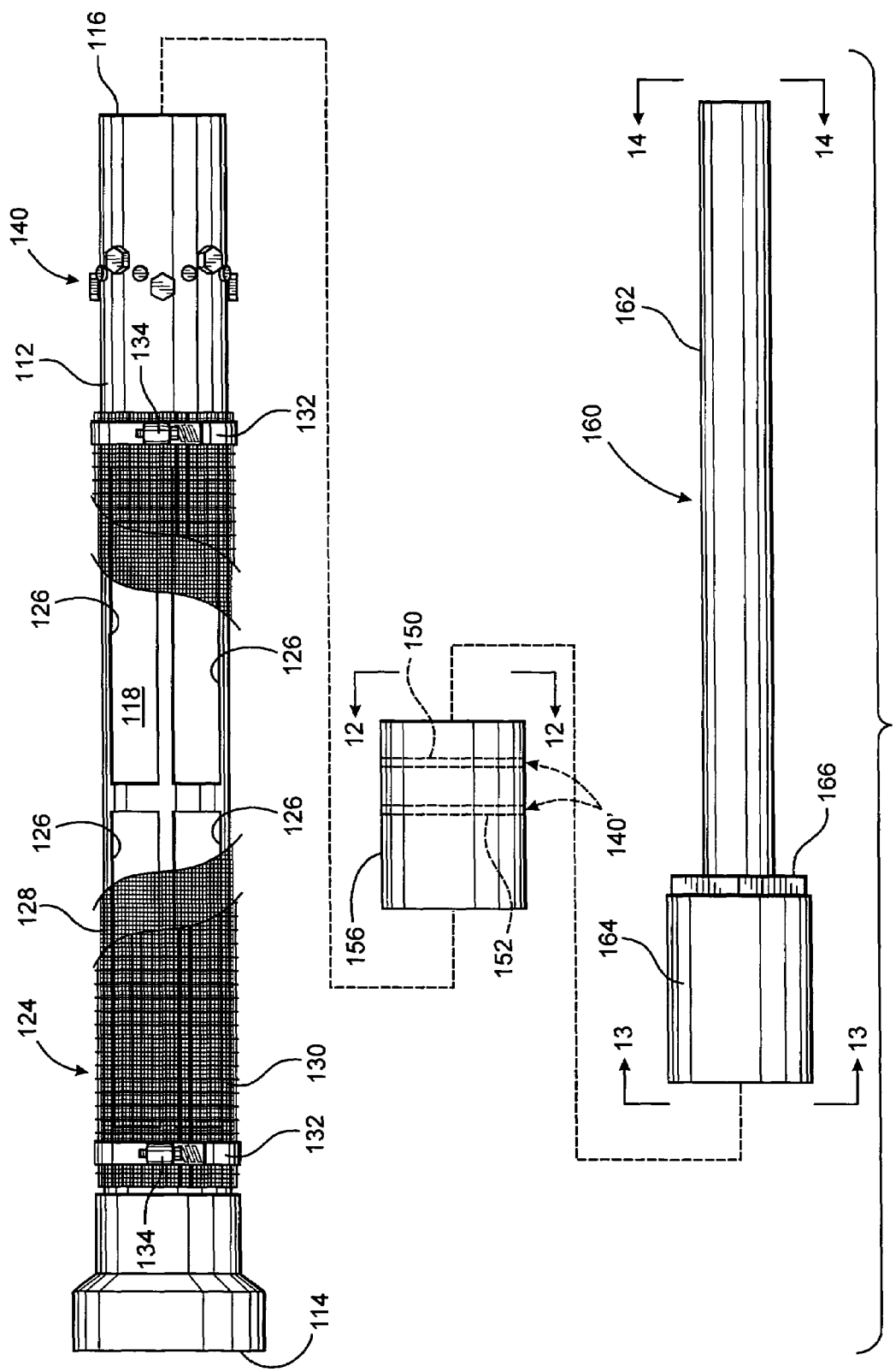

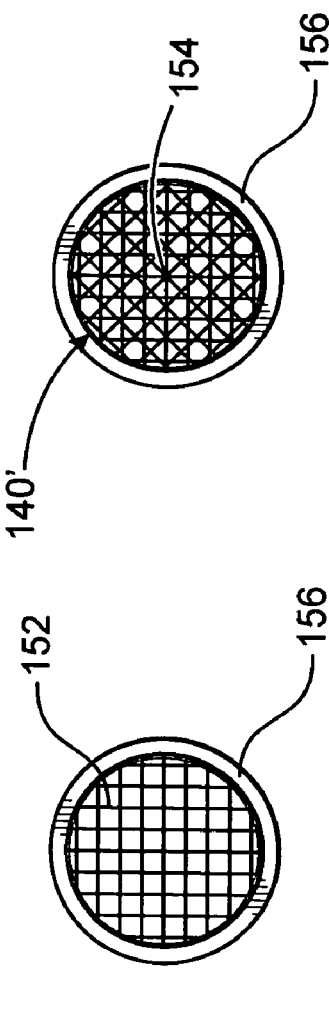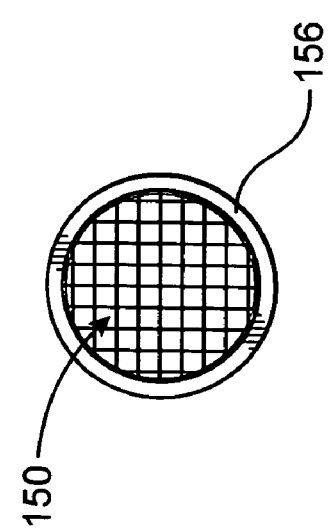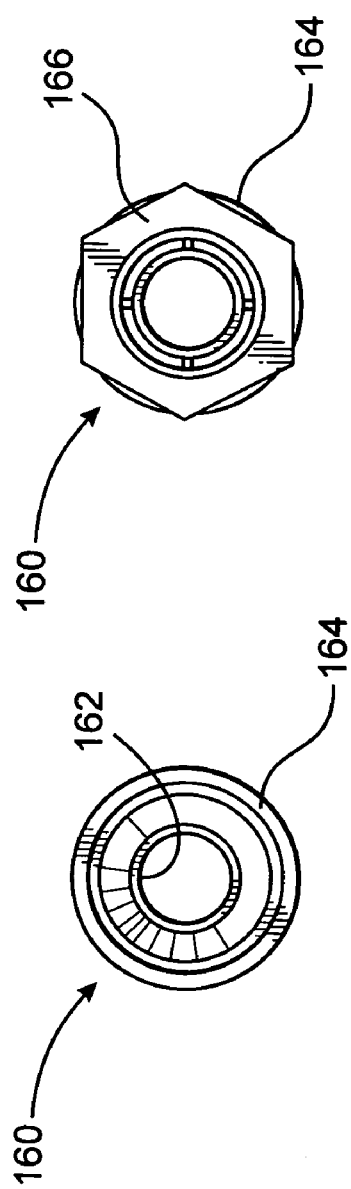

DISTRIBUTION ASSEMBLY FOR PARTICULATE MATERIAL

CLAIM OF PRIORITY

The present application is a continuation application of previously filed, now pending application, having Ser. No. 10/793,655, filed on Mar. 3, 2004 which is to mature into U.S. Pat. No. 7,137,579, which was a continuation-in-part application of then application, having Ser. No. 10/227,729, filed on Aug. 26, 2002 now U.S. Pat. No. 6,883,736, which are included herein in their entirety by reference.

BACKGROUND OF THE INVENTION

1. Field of the Invention

This invention relates to an assembly for distributing fertilizer, as well as a large variety of other particulate materials, which is adaptable to be mounted on different types of ground or water traveling vehicles. The distribution assembly is structured to regulate the introduction of the particulate material into an air flow thereby facilitating the distribution of the material throughout large and/or hard to reach areas as well as smaller, substantially confined areas.

2. Description of the Related Art

Air blower assemblies are well known and have been used for a variety of applications for many years. Typically, such devices are of relatively light weight construction and as such are portable, being typically hand held or otherwise supported on a user's body. In operation, such devices include the provision of an impeller which draws air into a housing and out through a housing outlet commonly associated with an elongated nozzle or like flow directing structure. The air is expelled at a significantly high flow rate in order to create an air stream having sufficient force to remove leaves, dirt and a variety of other types of debris from driveways, walkways and other surface areas.

The extensive use of known blower assemblies has led to their adaptation for numerous applications, other than that described above. More specifically, attempts have been made to structurally modify conventional blower assemblies for use either in a vacuum mode or in a forced air discharge mode, respectively intended to either collect or disperse debris and like materials. In addition to the above, blower devices have been found to be particularly useful, when structurally modified in the proper manner, to aid in the dispersement of various types of materials. Appropriately modified blowers intended for this use serve to supplement manual seed and/or fertilizer spreaders commonly employed to plant and maintain lawns, grass turf or the like. Therefore, it is generally recognized that the high velocity air stream generated by the typical blower assembly provides a versatile and efficient means of distributing materials throughout a wide variety of areas, not capable of being efficiently serviced by more conventional spreaders.

While such prior art attempts may be considered to be at least minimally operative in accomplishing their intended purpose, devices of this type lack versatility and have been found to be less than efficient. Other disadvantages associated with spreaders incorporating a forced air flow is an inability to adequately regulate delivery of the intended material due at least in part to an inconsistent feeding control of material to the generated air stream. This type of ineffective performance results in an uneven distribution of materials throughout the area being treated.

In addition, it has been found that attempted modifications to incorporate a blower commonly require the use of relatively short discharge nozzles, which limit the range or area throughout which the particulate material may be effectively spread. As a result, areas which are more difficult to reach must be serviced by hand and/or by personnel manually carrying a blower/spreader. However, when using high powered blowers, the high rate of material discharge results in a large quantity of material being discharged in a short period of time. Therefore unless an operator can carry a significantly large quantity of the material to be dispersed, the operator must repeatedly return to a supply area for replenishment of the material in order to properly service terrain which is not easily accessible. Accordingly it is obvious that such body supported assemblies, while being capable of reaching isolated areas, are not consistently operative for a long period of time and are therefore not practical.

Another problematic area associated with the distribution of fertilizer or other particulate material includes the fertilization or other treatment of potted plants. As set forth above, a distribution assembly for particulate material which incorporates a blower, typically relies on a high-velocity forced flow of air or airstream in which the particulate material is introduced. The high-velocity of the airstream is advantageous when directing the particulate material throughout a relatively large area or to areas located a significant distance from the material supply. However, the delivery of particulate material to a predetermined area of reduced size or space such as, but not limited to, a potted plant presents problems which are not easily overcome by conventional particulate material distribution assemblies.

Therefore, a preferred and improved distribution assembly should have sufficient versatility to include an adaptor assembly which is structured to facilitate the efficient delivery of particulate material to a confined space or area such as that defined by the potted plant. Such structural adaptation is of particular importance and benefit in the fertilization or other treatment of nurseries or farms having a large number of such potted plants.

In addition, there is a significant need for an assembly capable of effectively distributing particulate material having a wide range of particulate sizes. Such an improved distribution assembly should be capable of efficiently maintaining control of the supply of particulate material to a generated air stream, thereby distributing the particulate material substantially evenly throughout an area targeted for treatment. Further, such a preferred or improved distribution assembly should include operative and structural components which allow the delivery of material to areas of different sizes, locations and categories. More specifically, an improved distribution assembly of the type set forth herein, should have the structural and operational versatility to be used for the delivery of particulate materials to large and/or hard to reach areas as well as significantly smaller areas. In the latter category, an improved distribution assembly should be capable of material delivery to the predetermined area of reduced sizes, such as individual potted plants, as set forth above. In each of these various applications a variety of different vehicles may be used as a mobile support platform for the distribution assembly.

Further, such an improved distribution assembly should be easily converted, without structural modification, for use as a blower, in the conventional fashion, or as a spreader as described above. Finally, when utilized with a mobile platform, an improved distribution assembly should be easily mounted on and removed from the platform in order that the mobile platform can be used in the performance of other applications for which it may have been originally intended.

SUMMARY OF THE INVENTION

The present invention is directed to an assembly structured to rapidly and efficiently distribute a variety of different particulate materials such as, but not limited to, fertilizers, herbicides and the like by utilizing a blower assembly in combination with a uniquely structured manifold assembly. As such, the distribution assembly of the present invention overcomes many, if not all, of the disadvantages and problems associated with conventional or known particulate spreaders. In doing so, the distribution assembly may be used independently of or be mounted on any of a variety of different mobile platforms including wheeled vehicles or structures which are motorized or manually powered, as well as various types of marine craft. Accordingly, depending on the specific application, the distribution assembly of the present invention can be utilized to disperse particulate materials of various types and sizes over an extended ground surface, throughout a water environment and/or directly to smaller, substantially predetermined area of reduced sizes, spaces or locations, such as to potted plants.

In order to fully emphasize the versatility of the distribution assembly of the present invention, specifically relating to the size and type of material capable of being dispersed, the following provides examples of materials which may be effectively used with the subject distribution assembly. However, the following materials, sizes, categories, etc. are not meant to be all inclusive but are representative only of the wide range of particulate materials which may be dispersed in the intended fashion. More specifically, materials that can be distributed by the distribution assembly of the present invention include fertilizer for turf and ornamental plants, herbicides, pesticides, fungicides, rock salt, aquatic herbicide materials, agriculture materials, forestry grade fertilizers, pelletized fish food and marine nutritional supplements, minor elements, organic fertilizers, seed, granular wetting agents, granular baiting material, as well as others.

Also, the size of the particulate material capable of being dispersed by the distribution assembly of the present invention includes dust, powder, mini-pill, micro-pill, standard pill, homogeneous blend fertilizers, sand, etc. As such, the distribution assembly may be applicable for use in a variety of different areas including business segments associated with pest control, landscaping, turf management, municipalities, home owner associations, golf courses, theme parks, athletic fields, fisheries, aquatic control companies, tree farms, potted plant farms and nurseries, etc. Dependent on the treatment area and the particular embodiments of the distribution assembly utilized, the distribution rate of the particulate material which passes through the assembly can be as much as substantially 30 or more pounds per minute. Factors which affect the distribution rate include, but are not limited to the length of the discharge conduit, the blower size and the size and category of the area being treated, as set forth above. Moreover, when treating significantly smaller and/or generally predetermined area of reduced sizes such as, but not limited to, potted plants, more precise applications are required resulting in a slower discharge rate and the delivery of proportionately less material, over a given period of time.

The operational versatility of the distribution assembly of the present invention is further enhanced by at least some of the components thereof being removably secured to a mobile platform and being otherwise structured such that the user has the ability to control the use of the distribution assembly in direct association with various types of mobile platforms. In addition, the cooperative structuring of the distribution assembly and the mobile platform allows the mobile platform to operate in its normally intended fashion, when the distribution assembly attached thereto is temporarily and purposefully rendered inoperative. The ability to adapt the subject distribution assembly to a variety of different vehicles allows access to almost any land surface or body of water where appropriate vehicles can travel.

Accordingly, in at least one preferred embodiment, the distribution assembly of the present invention comprises a blower assembly structured to generate a substantially high velocity stream of air along a predetermined flow path. The predetermined flow path is at least partially defined by a plurality of operative components connected to one another, such that the generated air flow passes from the blower assembly along the predetermined flow path to a discharge conduit.

Further, in order to overcome additional recognized disadvantages and problems associated with known particulate material spreaders, the discharge conduit may be made from a flexible, high strength, durable material and also, in at least some of the preferred embodiments of the present invention, be of an extended length. The extended length of the discharge conduit facilitates the particulate material being delivered directly from a high capacity material supply throughout a wide area of dispersal. Also, the flexibility of the elongated delivery conduit allows it to be selectively disposed into any of an almost infinite number of positions or orientations in outwardly extending and/or substantially surrounding relation to the blower assembly and to the mobile platform on which the blower assembly and remaining components of the distribution assembly are mounted.

The distribution assembly further includes a manifold assembly interconnected in fluid communication with the blower assembly downstream thereof. Further, the manifold assembly is interconnected upstream of the discharge conduit and is structured to regulate the flow of air as well as the flow of material to and along the predetermined flow path and/or at least a portion thereof extending from the manifold assembly to the exit or discharge end of the discharge conduit. The manifold assembly includes a delivery conduit connected in communicating relation with the interior of a supply container in which the supply of material is maintained. The supply container can be a part of the vehicle or mobile platform, or separate therefrom, and can vary in size, capacity, configuration, etc. Preferably, the material supply container and the delivery conduit of the manifold are cooperatively disposed and structured to allow passage of the material into the delivery conduit by means of gravity flow and/or under the influence of a negative pressure. To adequately regulate flow of the particulate material through the delivery conduit and the associated manifold assembly, a valve assembly is disposed between the material supply and the delivery conduit. The valve assembly can be operated from a location on or off the mobile platform from a location spaced from the manifold assembly and the material container.

The manifold assembly further includes a receiving segment disposed directly within and defining at least a portion of the aforementioned predetermined flow path along which the generated air stream from the blower assembly travels. The receiving segment is connected in fluid communication with the delivery conduit, such that the material passing into the delivery conduit will travel downstream from the delivery conduit to the interior of the receiving segment. In at least one preferred embodiment of the present invention, the receiving segment includes a Venturi section characterized by a restricted or reduced diameter throat portion disposed along the flow path. Reduced pressure resulting from the well known Venturi effect will communicate with the delivery conduit, further facilitating passage of the particulate material there along to a location where it is introduced into the air stream and predetermined flow path. Once so introduced, the particulate material passes along the extended length of the discharge conduit until it exits from the outer, open end thereof.

As used in at least one preferred embodiment of the present invention, an extended length of the discharge conduit enhances the versatility of the distribution assembly by allowing the material to be spread over a larger dispersal area and into relatively hard to reach locations not previously obtainable using conventional or known spreader assemblies. Accordingly, one feature of a preferred embodiment of the present invention is structuring of the manifold assembly to include adequate venting, through the provision of a vent assembly. The vent assembly is structured to reduce the buildup of back pressure within the elongated discharge conduit and/or the manifold assembly itself.

Due to the extended length of the discharge conduit, rapid flow rate of the air stream passing along the flow path, and the orientation of the discharge conduit, the significantly large quantity of material being continuously channeled into the discharge conduit may have a tendency to "backup" or collect in the discharge conduit. Such material backup may be especially prevalent if dispersal of material from the discharge conduit is not done on a prolonged or continuous basis. The occurrence of such material backup produces the aforementioned back pressure within a length of discharge conduit. The existence of back pressure will frequently cause a back flow of material into and at least partially through the manifold assembly and possibly through the delivery conduit into the material supply container. The provision of the vent assembly connected to or incorporated within the manifold assembly provides an automatic release of the back pressure whether it originates along the length of the discharge conduit or at any point along the predetermined flow path, including the manifold assembly. In at least one preferred embodiment of the present invention the vent assembly is disposed in communicating relation between the interior of the delivery conduit and atmosphere, on the exterior of the manifold assembly.

Therefore, one or more preferred embodiments of the distribution assembly of the present invention are structured to efficiently disperse particulate material of varying sizes and types throughout either a land or water environment. The operational characteristics of the distribution assembly of the present invention is further enhanced by being structured for use in combination with or independently of a variety of different mobile platforms including land or water traveling vehicles. Also, in some relatively specialized applications, such as tree farms, groves, orchards, etc, a plurality of distribution assemblies may be mounted on the same vehicle and be concurrently but independently operated.

Yet another preferred embodiment of the present invention is directed to an applicator assembly having the structural versatility to be used with the distribution assembly of the present invention as set forth above. Alternatively, the applicator assembly may be used with any of a variety of other distribution assemblies of the type which incorporate a forced airflow in which particulate material is introduced. One operative feature of this preferred embodiment is its ability to reduce the velocity of the forced flow of particulate material to a sufficient degree that it may be delivered, with precision, to a predetermined areas of significantly smaller or reduced size. As used herein, such a "predetermined area of reduced size" is meant to include, but not be limited to, the exposed surface area surrounding the base of a plant and more commonly known and/or referred to as the root zone of a plant. Moreover, the root zone or other predetermined area of reduced size relates to the surrounding surface area of plants, regardless of the plant being grown in the ground or grown and/or maintained in a pot or other appropriate container.

As will be more apparent in a detailed description of the present invention hereinafter presented, it is emphasized that the various embodiments of the applicator assembly of the present invention are not limited to the distribution or delivery of particulate material to the root zone of a plant. To the contrary, one feature of the applicator assembly is its ability to deliver particulate material accurately and with precision to a predetermined area of significantly reduced size. In doing so, the velocity of the particulate material flow is sufficiently reduced to eliminate or significantly prevent the particles bouncing or ricocheting off of the intended target area. Accordingly, the intended, predetermined area or surface to which the particles are to be delivered may be other than the root zone or surrounding surface area of a plant. Also, the predetermined area to which the particulate material may be delivered can further include defined areas of a water environment, such as with particulate material other than fertilizer, as set forth above.

As described above, distribution assemblies incorporating a blower which creates a forced flow of air for carrying the particulate material through and out of a discharge conduit generally require that the air stream be traveling at a significant velocity. This facilitates the distribution of the particulate material over a wide area which may be located some distances from the distribution assembly or mobile platform on which it is mounted. However, when attempting to direct particulate material into one or more predetermined areas of reduced size such as, but not limited to, the root zone surrounding the base of a plant, the high-velocity of the air flow becomes a disadvantage. Therefore, at least one preferred embodiment of the applicator assembly of this invention is structured to reduce the velocity of the forced flow of particulate material passing there through. As a result, the particulate material issuing from a discharge end or opening of the applicator assembly travels at a much slower rate, thereby facilitating the delivery of the particulate material to an intended predetermined area of reduced size rather than "bouncing" or ricocheting outwardly therefrom.

More specifically, one preferred applicator embodiment includes a conduit or other type of housing having a hollow interior which at least partially defines a flow path of the particulate material. This material flow path preferably extends between an inlet and a discharge opening disposed in spaced relation to one another along the length of the applicator. The inlet is structured to be connected to the discharge conduit of the distribution assembly of the present invention or alternatively to the outlet of other type of distribution assemblies. The discharge opening is structured to receive any one or more nozzle type structures which further facilitates the accurate, independent delivery of the particulate material to selected predetermined areas of reduced size including one or more root zones.

Structural features included in this applicator embodiment comprise a vent assembly structured to establish fluid communication between the hollow interior or flow path and atmosphere on the exterior of the applicator. Therefore, the forced flow of air which serves to carry the particulate material is partially vented through the vent assembly thereby serving to reduce the velocity of the forced flow of particulate material prior to it reaching the discharge opening. In addition, the applicator preferably includes a diffuser assembly which is disposed in direct communication with the material flow path and more specifically in interruptive relation to the particulate material passing along the material flow path. The striking or contact of the particulate material with the diffuser assembly will further reduce the velocity of the particulate material prior to it exiting the discharge opening.

The diffuser assembly may assume a variety of different structures and in at least one preferred embodiment thereof, the diffuser assembly is adjustably positioned. Adjustable positioning of the diffuser assembly relative to the material flow path regulates or controls the interruptive contact or engagement of the particulate material with the one or more components of the diffuser assembly. By virtue of this adjustable feature, the velocity of the particulate material can be varied as needed, dependent at least in part on the quantity of particulate material issuing from the discharge opening of the applicator.

Therefore, at least one preferred applicator assembly embodiment of the present invention further enhances the versatility of any distribution assembly incorporating a forced flow of air carrying particulate material therein, particularly wherein the forced flow of air is generated by a blower assembly as described in detail herein. Quick and easy removal of the applicator assembly from the discharge conduit will allow the distribution assembly to disperse particulate material to much larger areas and at greater distances, without requiring structural modification of the distribution assembly.

Yet another preferred embodiment of the applicator assembly of the present invention is primarily designed for even more accurate and precise delivery of particulate material to even smaller predetermined areas. As such, this additional preferred embodiment is intended to be lightweight and portable at least to the extent of it being easily supported on or carried by an individual during its use. Moreover, when utilized in an intended manner, the applicator assembly is preferably oriented in an operative position which facilitates the discharge of the particulate material therefrom. As will be explained in greater detail hereinafter, a preferred operative position includes a substantially upright, at least partially vertical/angular orientation.

As set forth above, when distributing the intended particulate material it is important, particularly when treating root zones of plants, to distribute the fertilizer particles preferably over substantially the entire root zone. At the same time, the velocity of the particles and therefore the force with which the particles are discharged from the applicator must be such as to significantly reduce or preferably eliminate the tendency of these particles to bounce or ricochet off of the targeted surface area or root zone. It has long been recognized, particularly by those who are concerned with the fertilization of large numbers of young or small plants, that there is significant difficulty in precisely distributing the particulate material over or throughout the smaller root zones of the smaller plants. Therefore, in order to increase the accuracy and precision with which the particles are delivered, this preferred embodiment of the applicator assembly eliminates the use of a high velocity stream of air generated by a blower assembly or like device. To the contrary, the particulate material is forced from the applicator by means of gravity flow facilitated by the applicator being oriented in the intended, operative position, as set forth above.

In addition, even though a forced flow of air from a blower assembly is no longer utilized, this additional preferred embodiment of the applicator assembly still incorporates the use of a diffuser assembly. The particulate material, forced from the applicator under gravity flow, still travels at a velocity which may encourages the bouncing or ricocheting thereof from the intended predetermined area of reduced size or root zone. Accordingly, the diffuser assembly is disposed in interruptive relation to the particles as they pass from a supply or storage area within the applicator, to the discharge end and/or nozzle associated therewith. As such, the particles are more accurately delivered to the significantly smaller root zones and can be effectively spread over the root zones in a preferred or intended pattern. Therefore substantially all or at least intended portions of the predetermined area or root zone being treated can be covered.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 6 is a side view of the embodiment of FIG. 5.

FIG. 7 is an end view taken along line 7-7 of FIG. 6 showing interior details of the applicator assembly of the embodiment of FIG. 6 and one embodiment of a diffuser assembly associated therewith.

FIG. 8 is an end view taken along line 8-8 of FIG. 6 showing additional interior details of the applicator assembly and the diffusor assembly of FIG. 7 associated therewith.

FIG. 9 is an exploded view in partial cutaway of the embodiment of FIGS. 1 and 6 with additional structural components which may be attached thereto in the manner represented.

FIG. 10 is a detailed view of at least one component of another embodiment of the diffuser assembly of the present invention.

FIG. 11 is an end view of another component of the diffuser assembly of the embodiment of FIG. 10.

FIG. 12 is an end view taken along line 12-12 of FIG. 9 showing the diffuser components of the embodiment of FIGS. 10 and 11 in an assembled form.

FIG. 13 is an end view taken along line 13-13 of FIG. 9.

FIG. 14 is an end view taken along line 14-14 of FIG. 9.

Like reference numerals refer to like parts throughout the several views of the drawings.

DETAILED DESCRIPTION OF THE PREFERRED EMBODIMENT

Figure 1:
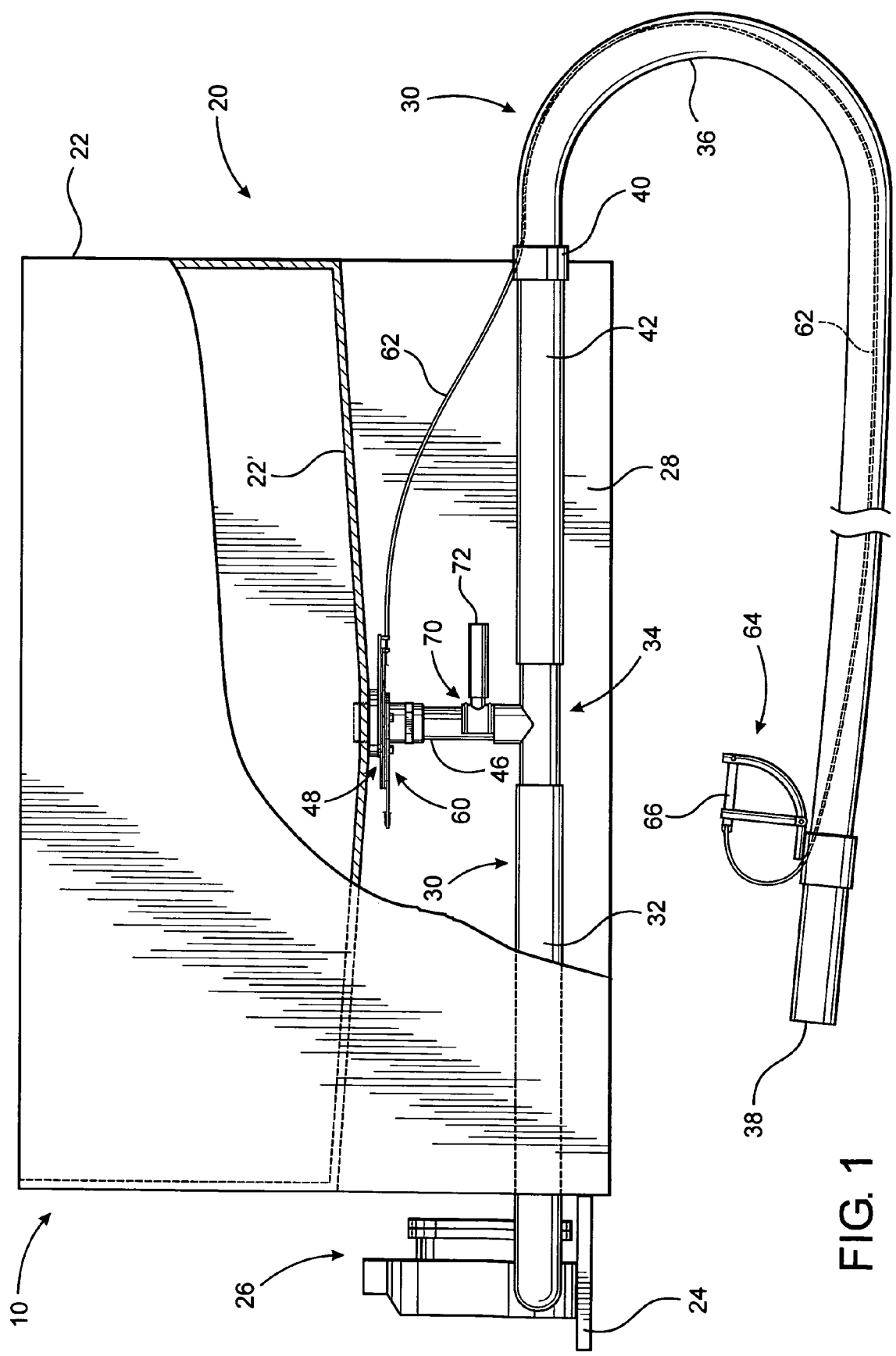
FIG. 1 is a side view in partial schematic form of a distribution assembly of the present invention mounted in combination with a material supply and adapted to be mounted on a variety of different vehicles or mobile platforms.

As shown in the accompanying Figures, the present invention is directed to a distribution assembly, generally indicated as 10 in FIG. 1, which is structured to distribute a wide variety of particulate materials such as, but not limited to, fertilizer and the like. As will be further evident from the following description of the one or more preferred embodiments of the present invention, the distribution assembly 10 may be mounted on any of a variety of different mobile platforms.

Figure 3:
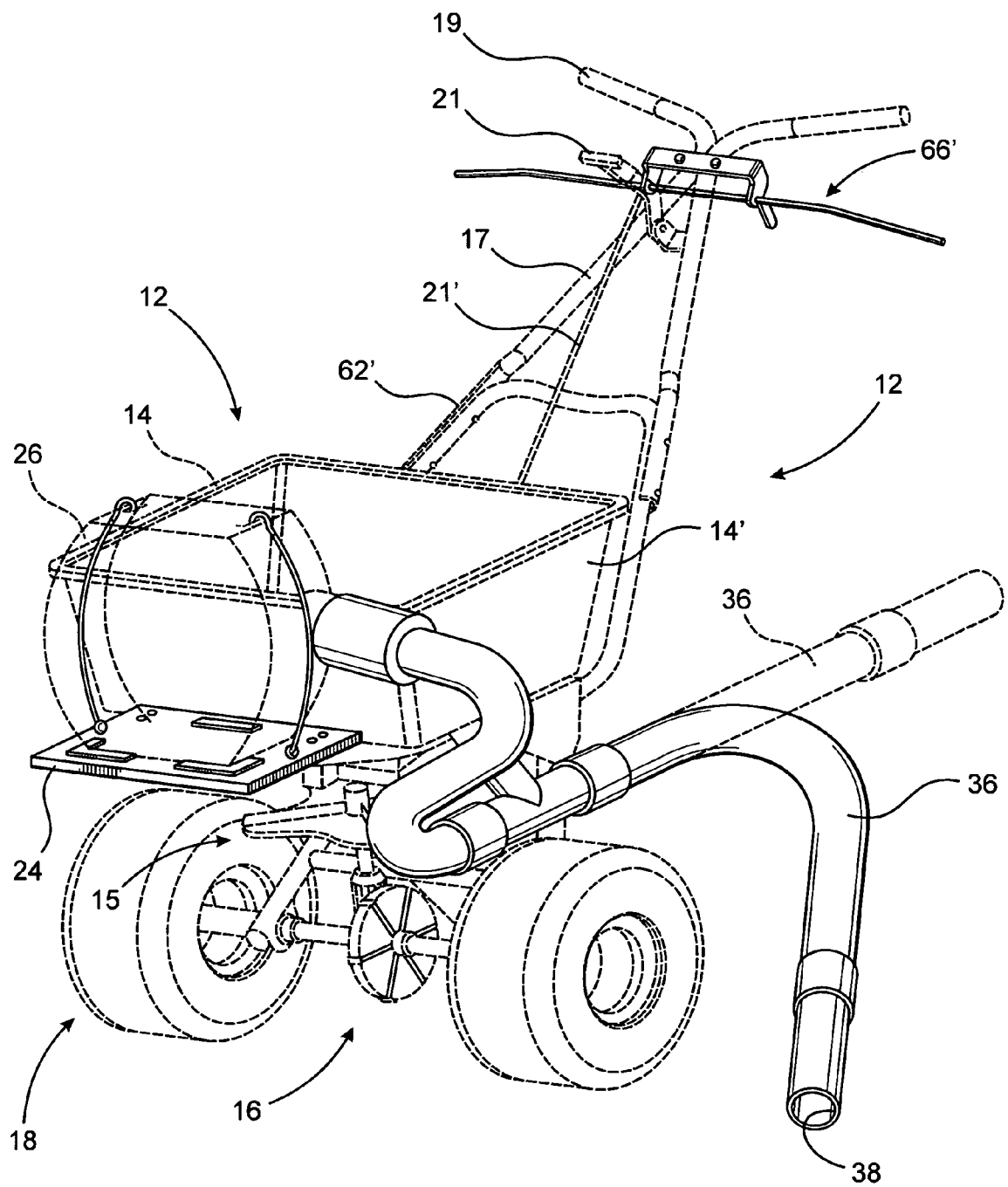
FIG. 3 is a perspective view in partial phantom of a mobile platform in the form of a manually propelled vehicle of the type readily adaptable for the mounting of the distribution assembly of the present invention thereon.
Figure 4:
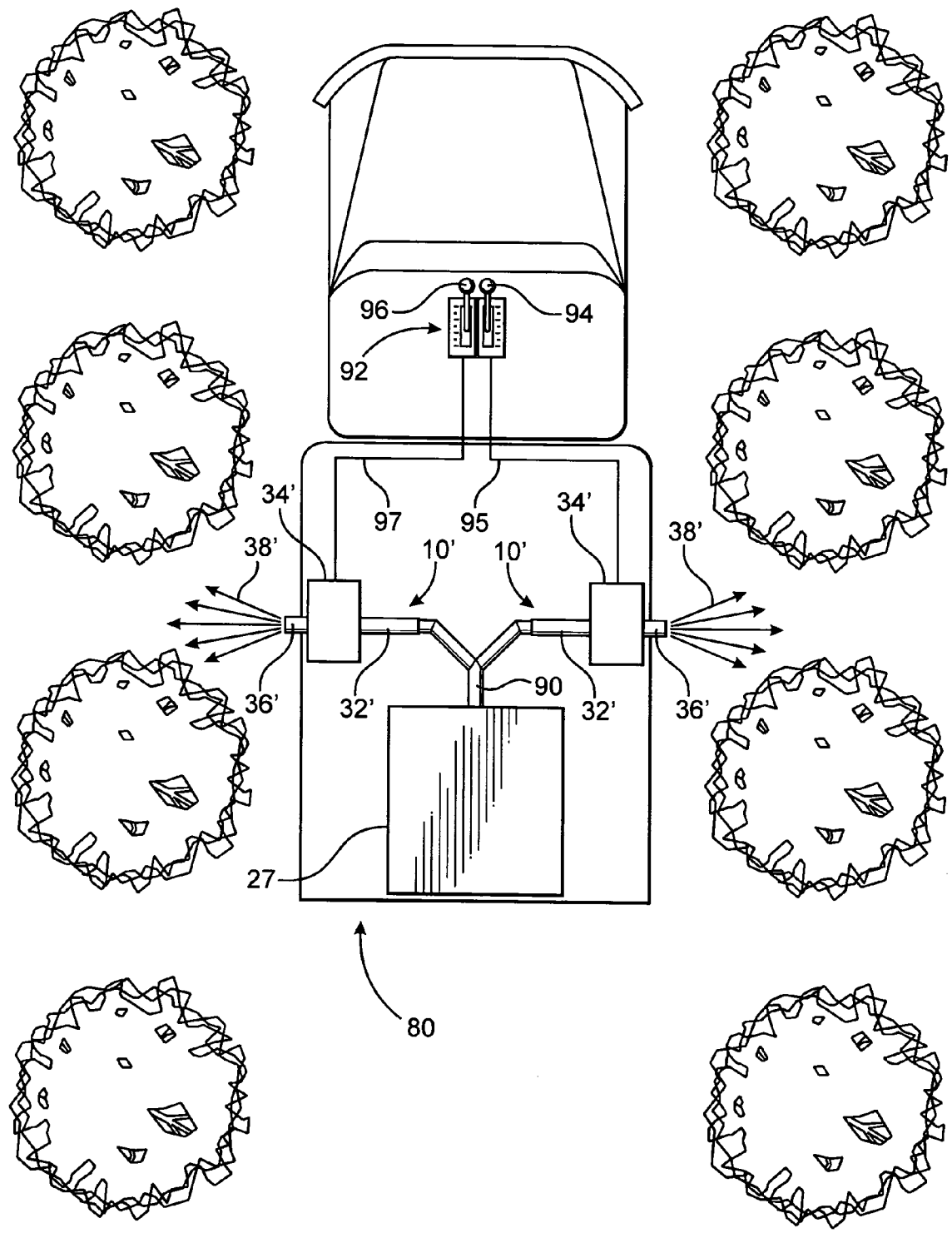
FIG. 4 is a top view in schematic form of yet another preferred embodiment of the distribution assembly of the present invention.
Figure 5:
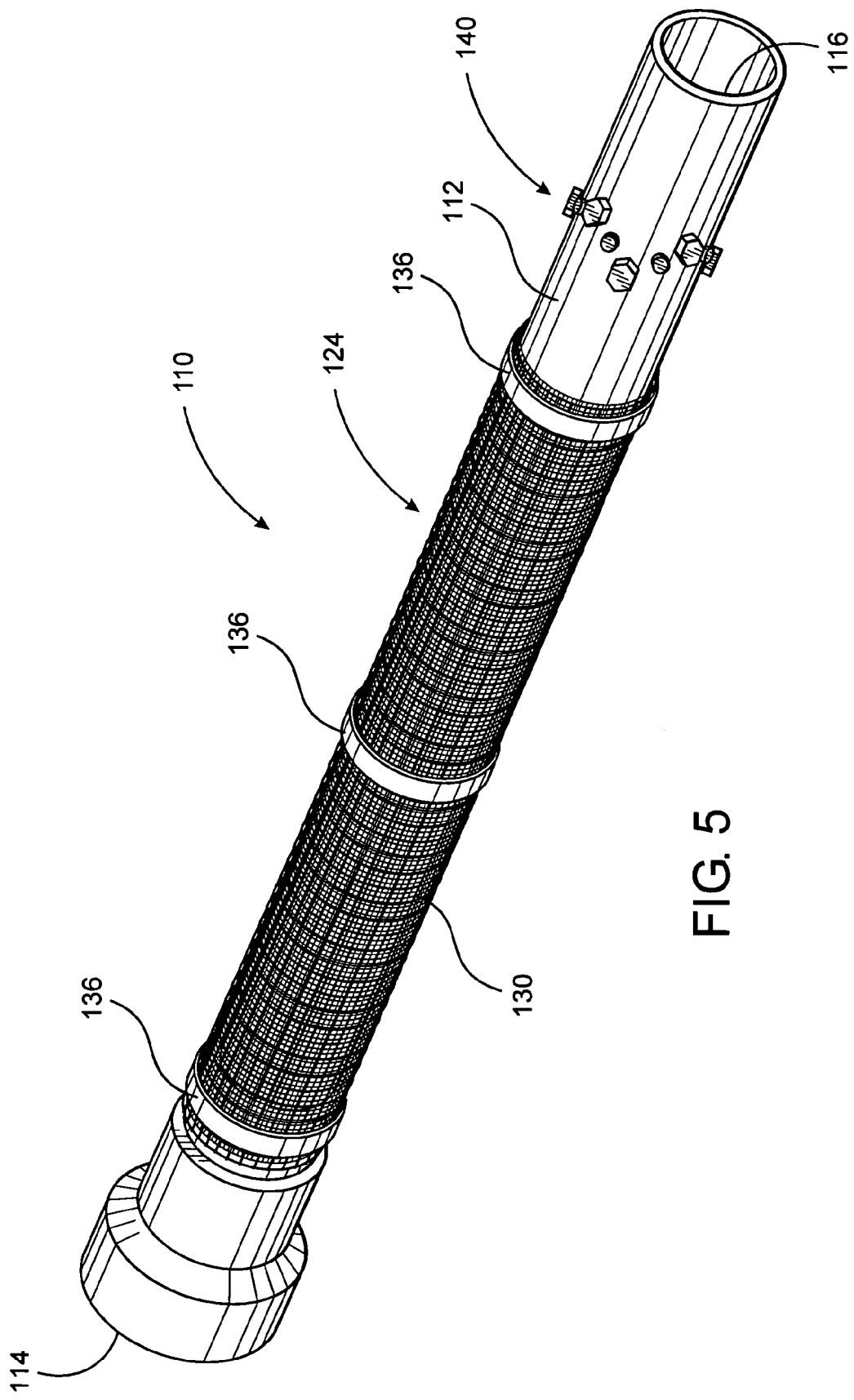
FIG. 5 is a perspective view of an applicator assembly of the present invention.
Figure 15:
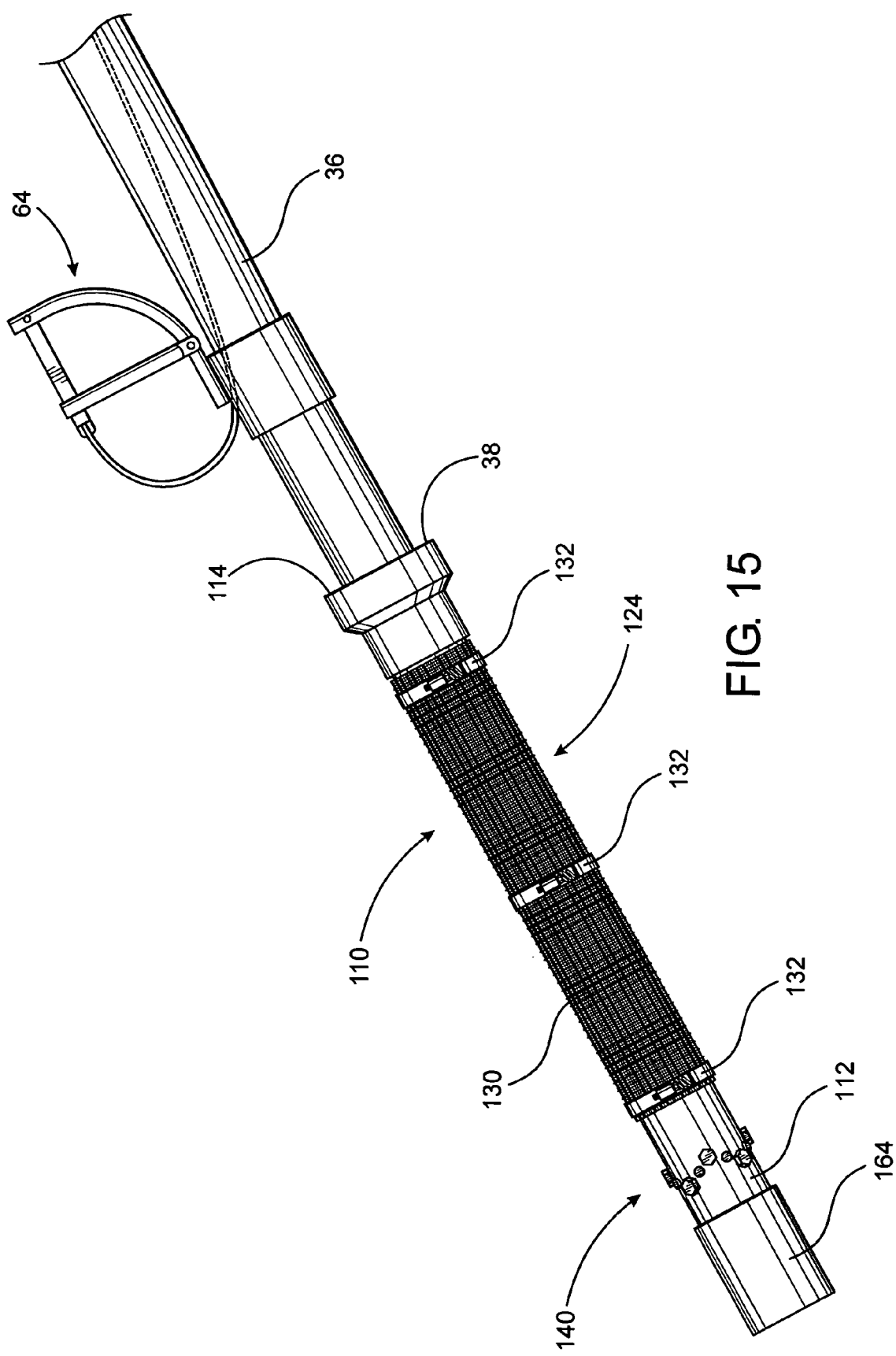
FIG. 15 is a side view in partial cutaway of the applicator assembly of the embodiment of FIGS. 5, 6 and 9 attached in material receiving relation to a discharge conduit of the distribution assembly as shown in FIGS. 1 through 3.

By way of example, such mobile platforms may include, but are not limited to, a manually powered spreader assembly generally indicated as 12 in FIG. 3 or a truck or other motorized vehicle generally indicated as 80 in FIG. 4. The adaptation of the distribution assembly of the present invention, including the various preferred embodiments thereof, will be described in greater detail hereinafter with primary references to the appropriate figures. In addition to the embodiments of FIGS. 3 and 4, the distribution assembly 10 of the present invention may be mounted on a mobile platform in the form of a marine craft. As such, the particulate material may be spread throughout a predetermined water environment, such as when it is desired to distribute aquatic herbicide materials, pelletized fish food and/or nutritional supplements, etc.

Accordingly, the structural and operational versatility of the distribution assembly 10 is further demonstrated by being connected to or mounted on a mobile platform generally indicated as 20, which is intended to be representative of any of a variety of different mobile platforms with which the distribution assembly of the present invention may be used. The mobile platform 20 includes a material supply 22, a support platform 24 for the mounting and/or support of a blower assembly 26 and an under carriage area generally indicated as 28. The under carriage area 28 may of course also vary greatly dependent on the type, category, structure, size, etc. of the mobile platform 20 on which the distribution assembly 10 of the present invention is mounted.

The blower assembly 26 may be of the type typically associated with hand held or portable blowers used to generate a forced flow of air for purposes of removing debris from lawn surfaces, walkways, driveways, etc. However, the blower assembly 26 is clearly not intended to be limited to any specific type of blower assembly other than that capable of generating an air stream with a sufficient force to travel along a predetermined flow path and outwardly therefrom for an acceptable distance.

The predetermined flow path is generally indicated as 30 and includes an adaptor section or conduit 32 and a manifold assembly generally indicated as 34. The adaptor section 32 is connected between the blower assembly 26 and the manifold assembly 34 and defines at least a portion of the predetermined flow path 30. In addition, the distribution assembly 10 further includes a discharge conduit 36 preferably formed from a flexible material and also having what may be referred to as an extended length. The extended length of the discharge conduit 36 may vary but preferably includes a longitudinal dimension of at least approximately five feet and greater.

The flexibility and extended length of the discharge conduit 36 allows variable positioning thereof relative to the mobile platform 20 on which it is mounted. As such, the particulate material being distributed may exit the outlet or discharge end 38 and be delivered to a variety of different locations throughout an extended range or area of distribution surrounding the mobile platform 20. Discharge conduit 30 may be fixedly or removably connected to the manifold 34 such as by a connection 40. The discharge conduit 30 is connected in fluid communication to the manifold 34 by a second adaptor conduit 42. The second adaptor conduit 42 may be an integral part of the discharge conduit 36 or may be fixedly or removably attached to the manifold assembly 34 dependent, at least in part, on the structure, size and/or configuration of the mobile platform 20 to which the distribution assembly 10 is attached.

One feature of a most preferred embodiment of the present invention comprises the manifold assembly 34 shown in detail in FIG. 2. The manifold assembly 34 includes a delivery conduit 46 having an open, hollow interior connected as at 48 to a base or wall portion 22' of a material supply 22. Through such connection, the particulate material is allowed to flow into the interior of the delivery conduit 46, along its length and exit from an outlet end 50. The outlet 50 extends into the interior of the receiving segment 52 and includes an angular orientation or configuration facing downstream of the aforementioned predetermined flow path 30.

Further, the receiving segment 52 includes a Venturi section 54 defined by a restricted or reduced diameter throat portion 56. Provision of the Venturi section 54 within the receiving segment 52 creates a negative pressure caused by the well known Venturi effect. The resulting negative pressure is communicated to the interior of the delivery conduit 46 further facilitating removal of the particulate material from the delivery conduit 46. The material is drawn through the open outlet end 50 and into the forced air flow as schematically represented by the directional arrow 58. The particulate material enters the predetermined flow path as it is introduced within and carried by the forced flow of air created by the blower assembly 26.

Other structural features associated with the distribution assembly 10 and in particular the manifold assembly 34 comprise the provision of a valve assembly generally indicated as 60. The valve assembly 60 is preferably spring biased or otherwise structured to be normally disposed in a closed position as shown in FIG. 2. As set forth above, the base 48 is secured to a bottom or side wall 22' of a material supply 22. As also set forth above, the valve assembly 60 is normally biased into a closed position due to the provision of a biasing spring 61, thereby preventing the gravity or negative pressure flow of particulate material from the material supply 22 into the manifold assembly 34.

With reference to FIG. 1, the valve assembly 60 includes a control assembly including a control line in the form of a wire, cable, etc. indicated as 62. The control line 62 extends to a location generally remote from the manifold assembly 34 and material supply 22. Depending on the particular embodiment being utilized, the control line 62 may extend along the discharge conduit 36 and may terminate adjacent to the discharge end 38. The control assembly further includes an operative control handle, which may assume a variety of different structures, generally indicated as 64. Control handle 64 serves to operate and/or selectively orient the control line 62 so as to selectively open or close the valve assembly 60. As indicated, the control handle 64 is manually operable and may also be spring biased as at 66. Therefore, a squeezing action or other manipulation exerted on the control handle 64 serves to position the valve assembly 60 into an open position and a release of the control handle 64 positions the valve assembly 60 into its normal, closed position.

Another feature of the present invention is the provision of a vent assembly generally indicated as 70. The vent assembly 70 is connected in fluid communication to the interior of the delivery conduit 46 and preferably between its opposite ends. The vent assembly 70 preferably includes a vent conduit 72 extending outwardly from its fluid communication with the interior of delivery conduit 46 to a location exterior of the manifold 34. The vent assembly 70 is disposed and structured to release any back pressure to an exterior of the manifold assembly 34 existing within the discharge conduit 36 or the manifold assembly 34 itself.

Numerous factors, such as the extended length of the discharge conduit 36, the flow rate of the particulate material passing along the flow path 30, and possibly the orientation of the discharge conduit 36 may cause at least some of the particulate material to "back-up" or become at least temporarily collected within the discharge conduit 36. As a result of the forced flow of air 31, schematically represented by the directional arrow in FIG. 2, continuously passing through and along the predetermined flow path 30, there may be a build-up of back pressure. Such back pressure may extend through and into the manifold assembly 34 and have a tendency to force air flow, as well particulate material, in a reverse direction, up through the delivery conduit 46, as schematically represented by the directional arrow 73.

In order to prevent a back-up of the particulate material into the material supply 22, the vent assembly 70 serves to release any back pressure and/or back flow of air and material through the manifold assembly 34. The intended release of the back pressure is accomplished by the back flow being allowed to pass from the discharge conduit 36, through the vent assembly 70. More specifically, the back flow of air and material, due to the existence of back pressure along the path of fluid flow 30, may pass from the interior of the delivery conduit 46 to the exterior of the manifold assembly 34 through the vent conduit 72. As represented in both FIGS. 1 and 2, the vent assembly 70 maintains fluid communication between the interior of the manifold assembly 34 and the delivery conduit 46 and in doing so may assume a variety of different structures, dimensions and configurations. Other structural features of the vent assembly 70 may include a connecting conduit as at 72' integrally connected to the delivery conduit 46 at a location intermediate the opposite ends thereof. Such connecting conduit 72' may be fixedly or removably connected to the vent conduit 72 as shown in FIG. 2.

Again it is to be emphasized that the versatility of the distribution assembly 10 of the present invention is further evident by its ability to be either removably or fixedly secured to any of a variety of different mobile platforms such as 12, 20, etc. By way of example, when mounted on the manually powered mobile platform 12, as demonstrated in FIG. 3, the manifold assembly 34 would be attached in an area generally associated with the under carriage, such as at 15. Similarly, the support platform 24 for the blower assembly 26 may be secured to any preferred portion or surface 14' of the material supply 14 or other part of the mobile platform 12.

With further reference to FIG. 3, the spreader assembly 12' includes a material supply container 14 and a spreader mechanism generally indicated as 16. With or without the presence of the distribution assembly 10, the spreader mechanism 16 is interconnected by appropriate gearing to the wheel support mechanism 18 in a known manner. Material delivered by gravity from the material supply 14 is distributed by the spreader mechanism 16 in corresponding relation to the speed of travel of the spreader assembly 12'. Therefore, the spreader assembly 12' may operate in the conventionally intended fashion, even when the distribution assembly 10 of the present invention is mounted thereon, simply by maintaining the valve assembly 60 in its normally closed position. A control handle and associated positioning rod or member 21 and 21' serve to release the material within the material supply 14 to the spreader mechanism 16, in the conventional and intended manner.

However, when it is desired to activate or operate the distribution assembly 10 while supported on the mobile platform 12 of FIG. 3, the control handle 20 and control member 21' are oriented in a closed position. A spring biased control handle 66' is manually operable to selectively dispose the valve assembly 60 into either the aforementioned open or closed positions thereby controlling the flow of particulate material from the material supply 14 into the manifold assembly 34. For purposes of clarity the valve assembly 60, manifold assembly 34 and other operative components of the distribution assembly 10, as described in FIGS. 1 and 2, are not shown in FIG. 3. In use, an appropriate control line 62' associated with the valve assembly 60 may extend along the handle assembly 17 of the mobile platform 12. The control line 62' is attached to the aforementioned control handle 66' which is moveably mounted within the reach of the hands of the user, relative to the handlebar structure 19.

As disclosed in the embodiment of FIG. 3, as well as the other preferred embodiments of the present invention, the discharge conduit 36 is preferably of extended length. Also, the discharge conduit is preferably formed of a flexible material thereby facilitating its orientation into any of an almost infinite number of positions during the distribution process. However, as set forth above, due to its extended length and flexibility, certain orientations of the discharge conduit 36, such as that represented in phantom lines of FIG. 3, may also facilitate the backup of material within the discharge conduit 36, resulting in the creation of back pressure, as set forth above. Accordingly, the provision of the venting assembly 70 is disposed and structured to relieve such conditions.

FIG. 4 discloses another application of the present invention wherein a plurality of distribution assemblies each represented as 10', are mounted on a mobile platform, generally indicated as 80, in the form of a truck or other motorized vehicle. Each of the distribution assemblies 10' include an independent manifold assembly schematically indicated as 34' receiving forced air flow at least one common blower assembly mounted on or within a housing as at 27. When a single blower assembly is utilized an appropriate connection as at 90 may be provided so as to provide the forced air flow from the blower assembly/housing 27 to the individual manifold assemblies 34'. In addition, each of the manifold assemblies 34' are supplied with the forced flow of air by separate conduits or adapters 32'. Also, discharge conduits and the discharge ends thereof 36' and 38' respectively, are located downstream of respective ones of the manifold assemblies 34' and are positioned so as to concurrently direct particulate material outwardly therefrom into a predetermined distribution area. By way of example, the distribution areas are schematically represented by adjacent rows of trees or other plants. Naturally, the specific location of the discharge conduits 36' may be altered and/or selectively adjustable dependent upon the particular application and location of the respective distribution areas which they are intended to cover.

Also, a control assembly generally indicated as 92 may include a single control assembly but more preferably comprises separately operable control handles 94 and 96. Each of the control handles 94 and 96 are connected by a control line 95 and 97 to a material flow regulating valve assembly such as, but not limited to, the valve assembly 60 (not shown) associated with each of the manifold assemblies 34'. Accordingly, the control assembly 92 allows for the concurrent and/or independent operation of each of the distribution assemblies 10' so as to regulate the particulate material issuing from each of the discharge conduits 36' as shown.

Yet another preferred embodiment of the present invention is directed to an applicator or applicator assembly generally indicated as 110 and disclosed in detail in FIGS. 5-16. The applicator 110 is structured to be used with a distribution assembly for particulate material which incorporates a forced airflow or airstream including, but not limited to, the type which originates from a blower assembly 26 as described above. As such, the applicator 110 is structured to be quickly and removably connected to an outlet end 38 of a discharge conduit 36 as also described above.

More specifically, the applicator 110 includes an elongated, conduit like housing 112 including an open inlet 114 and an open discharge end 116. The inlet 114 and the discharge end 116 define opposite ends of the conduit or housing 112 and both communicate with a substantially hollow interior 118 extending along the entire length of the conduit 112 between the inlet 114 and the discharge end 116. For reasons to be explained hereinafter, the structural and operative features of the applicator 110 are such as to significantly reduce the velocity of the forced air flow or air stream passing through the discharge conduit 36 and exiting the outlet 38 into the hollow interior 118 of the applicator 110. The reduction in the velocity or rate of flow of the forced air stream entering the inlet 114 will of course reduce the velocity or rate of flow of the particulate material introduced into and carried by the forced flow of air generated by the blower 26 of the distribution assembly 10.

The reduced rate of flow or travel of the particulate material along the material flow path defined within the hollow interior 118, the applicator 110 and between the inlet 114 and the discharge end 116 will facilitate the efficient delivery of the particulate martial to what is referred to herein as a "predetermined area of reduced size". By way of example, such a predetermined area is meant to include and be descriptive of a significantly small and generally defined space or area such as, but not limited to, the root zone of a plant generally indicated as 120 or 120' in FIGS. 16, 25 and 25A through 25D. It is emphasized that a "predetermined area of reduced size" is not intended to be limited specifically to the root zone or surface area surrounding the base of a potted plant 122, but is intended to include the root zone 120 of a plant which may not be growing in a pot or other container. When considering the delivery of particulate martial by a forced flow of air to such a predetermined area, it has been determined that the velocity of the air flow and the particulate material carried thereby must be significantly reduced to avoid displacement of the particulate martial. When the velocity of the air stream as well as the particulate material is too great, the material will frequently "ricochet" or bounce from such a predetermined area especially when it is of a significantly small or reduced size. As such the intended fertilization or other treatment or processing of the root zone 120 is not effectively accomplished.

Figure 16:
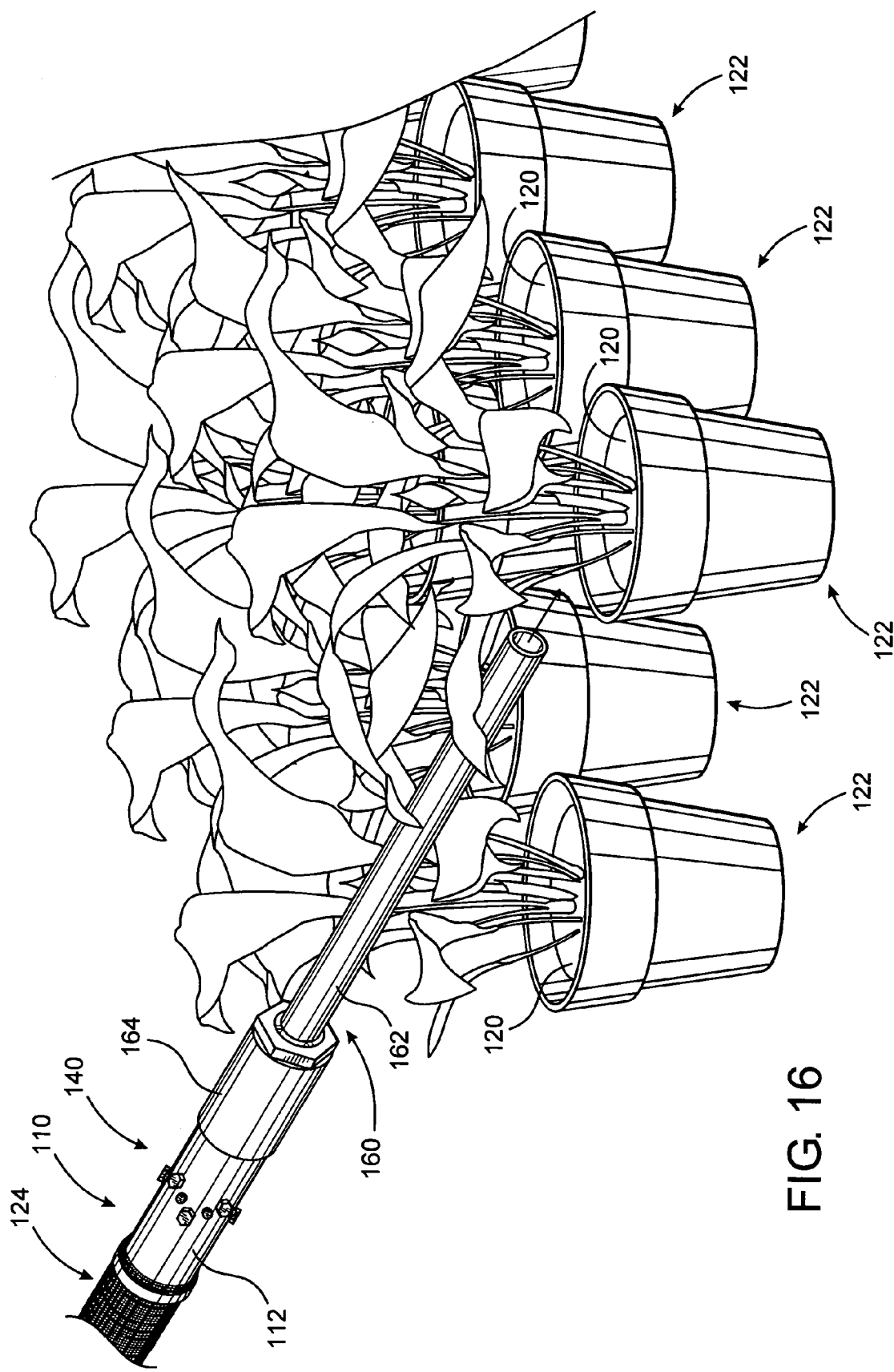
FIG. 16 is a perspective view in partial cutaway of the embodiment of FIG. 9 representing the delivery of particulate material to one or more predetermined area of reduced sizes which, by way of example only, are represented by the area or space within one or more potted plants.
Figure 17:
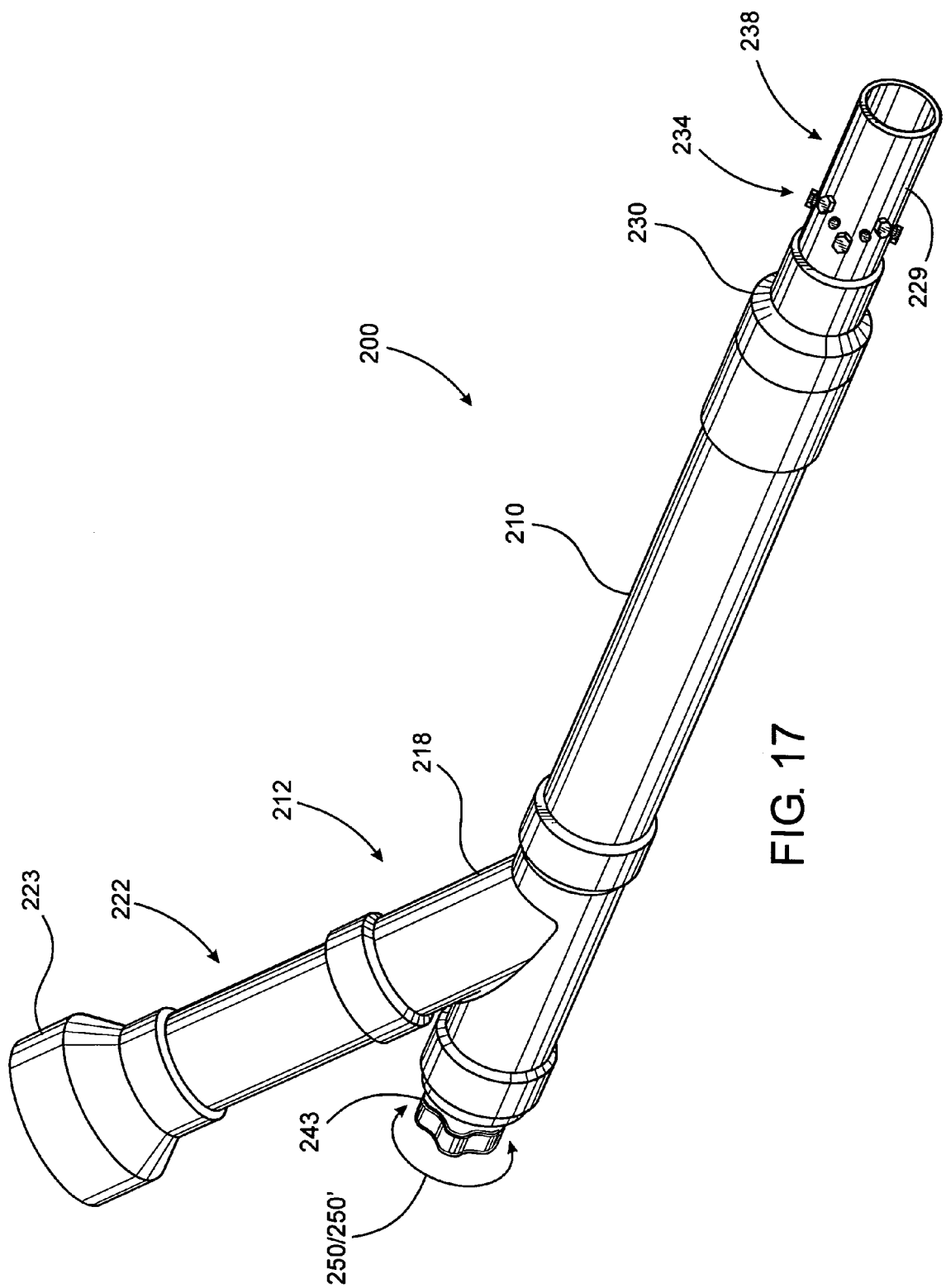
FIG. 17 is a perspective view of yet another preferred embodiment of an applicator assembly of the present invention.
Figure 18:
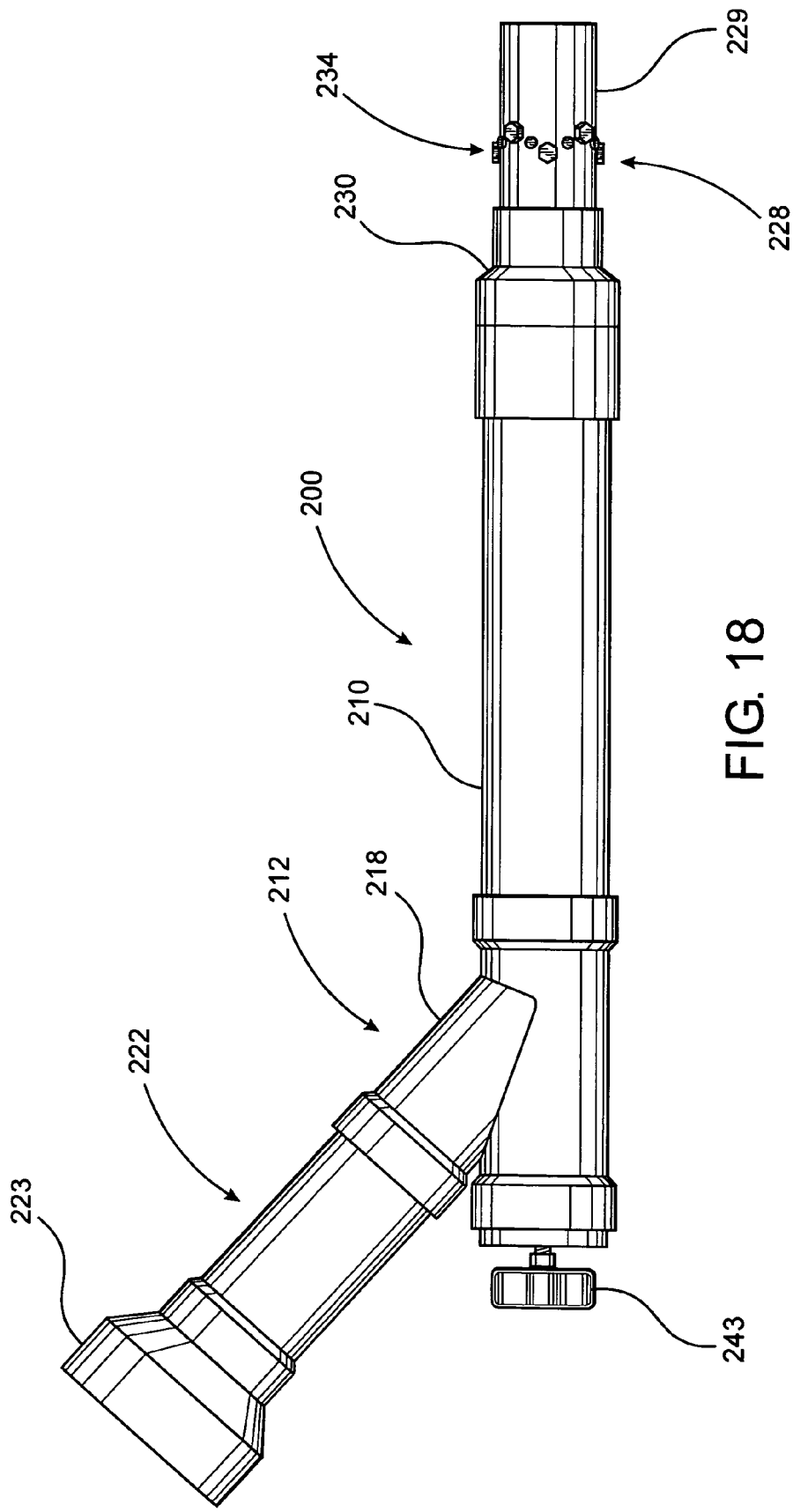
FIG. 18 is a side view of the embodiment of FIG. 17.
Figure 20:
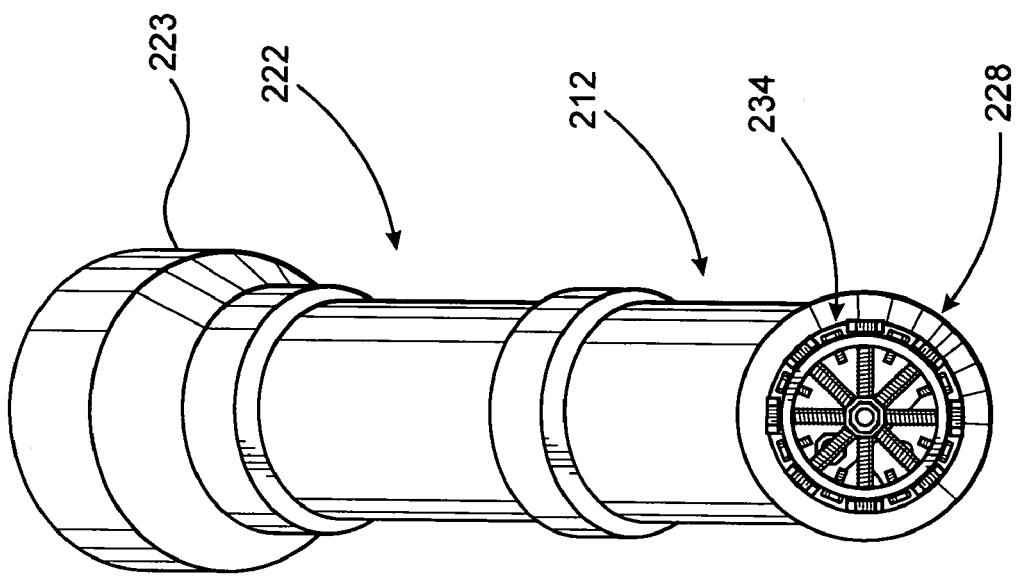
FIG. 20 is an end view opposite to that of FIG. 19 of the embodiments of FIGS. 17-19.
Figure 19:
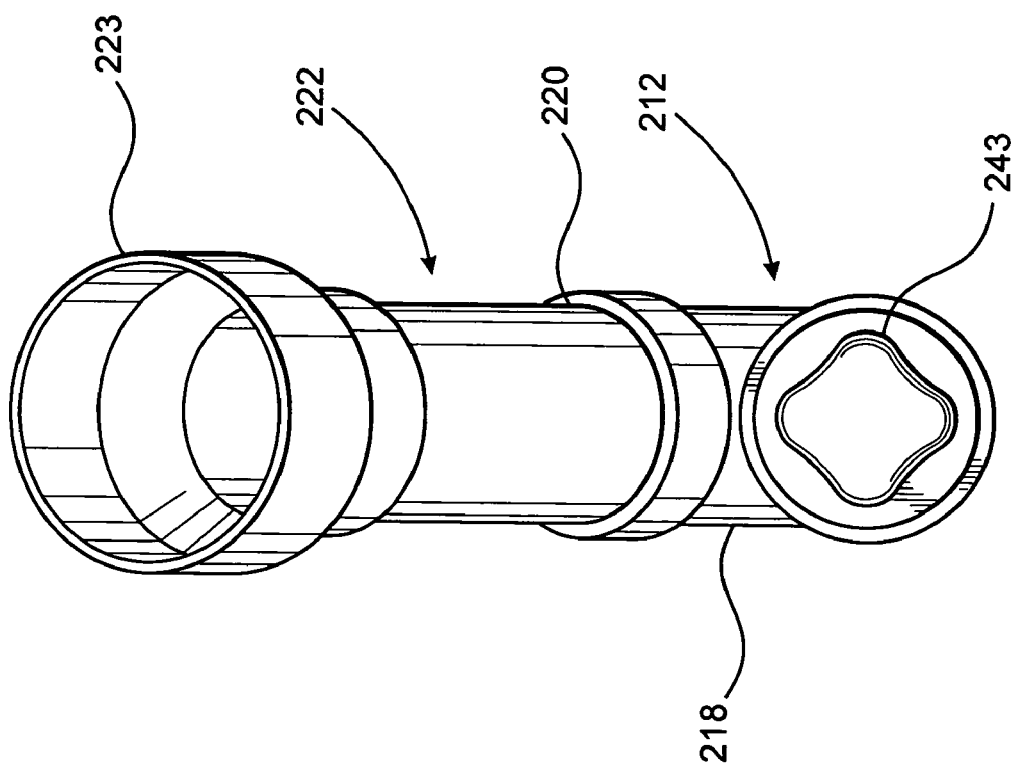
FIG. 19 is an end view of the embodiment of FIGS. 17 and 18.

Therefore, structural and operative features which facilitate the delivery of the particulate material to the predetermined area of reduced size, such as that represented by 120 in FIG. 16, is accomplished, at least in part, by incorporating a vent assembly 124 in the applicator 10. With primary reference to FIG. 9, the vent assembly 124 includes at least one but more practically a plurality of apertures or openings 126 formed in the wall of the conduit housing 112. The number, location and specific dimension of each of the one or more openings 126 may vary. However, the purpose of the one or more vent openings 126 is to allow the forced flow of air to exit from the interior 118 of the applicator 110 outwardly to atmosphere, on the exterior of the housing 112 as should be apparent. Such venting will cause a reduction in the velocity of the forced flow of air or airstream along the material flow path defined by and along the hollow interior 118 between the inlet 114 and the discharge end 116.

However, as clearly stated the intended purpose of the applicator 110 is to deliver particulate material to one or more predetermined areas of reduced size 120 in an efficient manner. Therefore, while the air is allowed to vent through the one or more openings 126, the particulate material carried by the forced airflow must be contained within the hollow interior 118 and forced to travel along the material flow path between the inlet 114 and the discharge end 116. To accomplish this, the vent assembly 124 further includes a retaining assembly including one or more screen-like retainers 128 and 130 as demonstrated. The retainers 128 and 130 have an open mesh construction through which air is allowed to pass to the exterior of the applicator 110. It should be noted that the mounting of the retainer screens 128 and 130, or other retaining structures could vary significantly dependent upon the overall structure of the applicator 110. As such, in at least one preferred embodiment shown in FIG. 9, the retaining screens 128 and 130 are maintained by locking or binding rings 132 on the exterior of the screen 130 and in surrounding relation to the applicator. For purposes of repair or replacement of the applicator and or the various components thereof, the mounting rings 132 can be easily attached and removed from their operative position by means of the locking bolts or like connectors 134.

As set forth above, it is important that the velocity or rate of flow of the forced air stream and the particulate material carried thereby must be reduced to a sufficient degree to allow effective delivery of the particulate material to one or more root zones 120. Therefore the overall "size" of the vent assembly 124 must be such as to reduce the velocity of the air stream, by adequate venting thereof, as the air stream travels along the material flow path on the interior of the applicator. Accordingly, in at least one preferred embodiment the vent assembly 124 extends along at least a majority of the length of the conduit housing 112, wherein the number, size and/or configuration of the one or more vent openings 126 are sufficient to accomplish adequate venting for this purpose. It is again emphasized, that as the air passes outwardly through the retaining screens 128 and 130, the particulate material is retained within the material flow path as it travels between the inlet 114 and the discharge end 116. Moreover, in order to assure proper venting, the one or more vent openings 126 can be formed in the peripheral and/or cylindrical wall of the conduit housing 112 and thereby collectively surround the hollow interior 118. Correspondingly, the retaining members 128 and 130 may also be disposed in surrounding relation to the exterior of the conduit housing 112 in order to overly or cover the one or more vent openings 126, thereby serving to retain the particulate material as indicated.

Further structural and operative features of the applicator 110 include the provision of a diffuser assembly 140. The diffuser assembly 140, as shown in detail in FIGS. 7 and 8 comprises a plurality of inwardly directed fingers 142 and 144 which are adjustable to the extent of being directed inwardly or outwardly relative to the hollow interior 118. Accordingly, the diffuser fingers 142 and 144 are adjustably disposed into interruptive engagement with the material flow path and the particulate material passing there along. With reference to FIG. 6, it is noted that each of the fingers 142 and 144 are laterally spaced from one another and also may be disposed in a staggered or non-aligned relation as they are displaced from one another longitudinally relative to the length of the applicator 110 and/or conduit housing 112. Further, each of the fingers 142 and 144 may comprise exteriorly threaded bolt-like members which are threaded into the corresponding portion of the cylindrical or peripheral wall of the conduit housing 112 as represented. Due to the threaded connection of each of the bolt/fingers 142 and 144, each may be adjustably disposed inwardly or outwardly from the hollow interior 118 schematically indicated by the directional arrows 145. With reference to FIG. 6, threaded axial adjustment of each of the bolt/fingers 142 and 144 can be accomplished using conventional tooling dimensioned and configured to grip the head portions 142' and 144' as demonstrated in FIG. 6.

The adjustable feature of the bolt/finger 142 and 144 is provided to further regulate the velocity of the particulate material prior to such material exiting the discharge end 116. When in the fully inwardly disposed or extended position there will be more interruptive contact between the particulate material and the inwardly disposed portions of the bolt/fingers 142 and 144. To the contrary, when the bolts/fingers 142 and 144 are extended outwardly from the position shown in FIG. 8 there will be less of an interruptive contact thereby regulating the velocity of the particulate material along the material flow path to increase. It has generally been determined that the greater the quantity of particles passing through the material flow path, the less interruptive contact need be made between the bolt/fingers 142 and 144 and the particles. This is because the greater the quantity of particles, the greater the frequency of particle collisions with one another, thereby reducing their flow rate. When fewer particles pass along the material flow path, the bolt/fingers are extended inwardly into the interior 118 to a greater extent to increase the interruptive contact there between since the particles will be colliding with one another at a reduced frequency.

Another embodiment of the diffuser assembly is generally indicated as 140' in FIGS. 9-12. The diffuser assembly 140' may be used in combination with the diffuser assembly 140 or as a substitute therefore. More specifically, the diffuser assembly 140' includes at least one but possibly a plurality of diffuser screens 150 and 152 both mounted in interruptive relation to the particulate material and in a transverse relation to the length of the material flow path and the particulate material carried there along. Each of the diffuser screens 150 and 152 include an open mesh structure dimensioned to facilitate passage of the forced flow of air there through. In addition, while the openings of the open mesh structure of the diffuser screens 150 and 152 may vary, they should be collectively dimensioned to cause the adequate interruptive contact of the particles there with. As set forth above with regard to the description of the diffuser assembly 140, such interruptive contact will further reduce the flow rate or velocity of the particles as they pass through the diffuser assembly 140'. In order to further regulate and/or reduce the velocity of the particulate material, the diffuser screen are rotated or otherwise oriented until they are in a non-aligned or angularly offset relation as demonstrated in FIG. 12. Interruptive contact with the particles of the material of course increase when the diffuser screens 150 and 152 are arranged in the orientation demonstrated in FIG. 12.

As also noted in FIG. 9, the diffuser assembly 140' may be mounted within a separate, separable conduit section 156 removably securable to the discharge end 116. Greater versatility is thereby provided by allowing the diffuser assemblies 140 and 140' to be used in combination with one another or separately. Alternatively, the diffuser screens 150 and 152 may be mounted on or connected directly to the conduit housing 112 upstream or downstream of the discharge end 116 rather than on a separate conduit section 156.

Another structural feature of the preferred embodiment of FIGS. 5-16 is the provision, if required, of a nozzle or particle directing structure generally indicated as 160. The nozzle 160 has outlet section 162 of significantly reduced diameter than that of the discharge end 116 and/or the hollow interior 118 of the conduit housing 112. A connecting end 164 is dimensioned and configured to be removably secured to or in surrounding relation about the discharge end 116 in order to facilitate passage of the reduced air flow and particulate material there through into and along the particle directing section or nozzle 160. As clearly demonstrated in FIG. 16, the nozzle 160 facilitates the more precise delivery of the particulate material independently to each of one or more predetermined area of reduced sizes 120 such as that represented by the open surface or base of a potted plant 122. Other features of the nozzle 160 may include fixedly or integrally secured adjustment portion 166 which may facilitate the removable attachment of the nozzle 160 to the conduit housing 112 adjacent the discharge end 116. It is emphasized that the nozzle 160 may assume a variety of different dimensions, configurations and dials dependent, at least in part, on the location, size, type, etc. of the predetermined area of reduced size 120 to which the particulate material is to be delivered.

Figure 21:
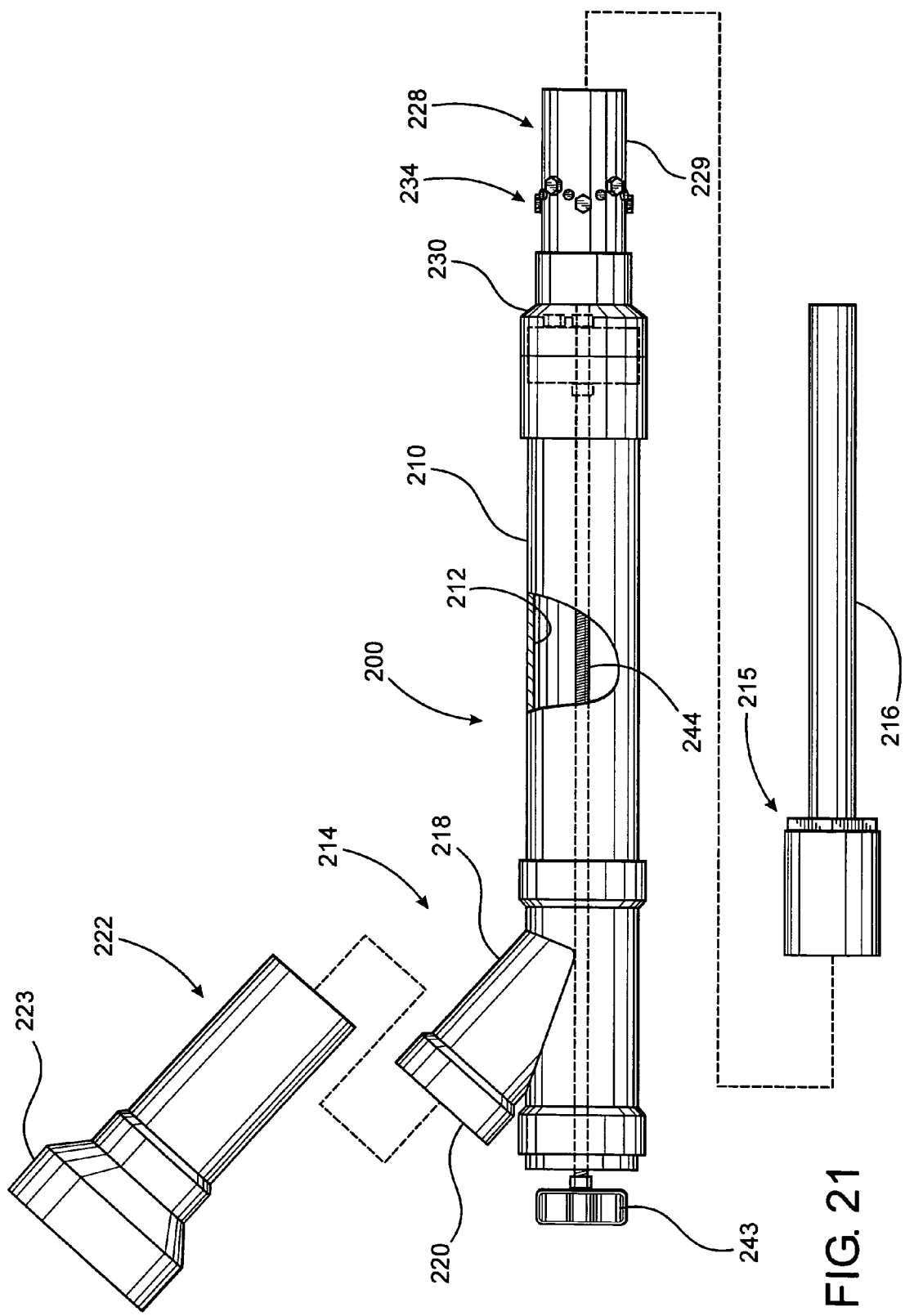
FIG. 21 is an exploded view representing the various operative components and their relative positions of the applicator assembly of the embodiment of FIGS. 17-20.
Figure 22:
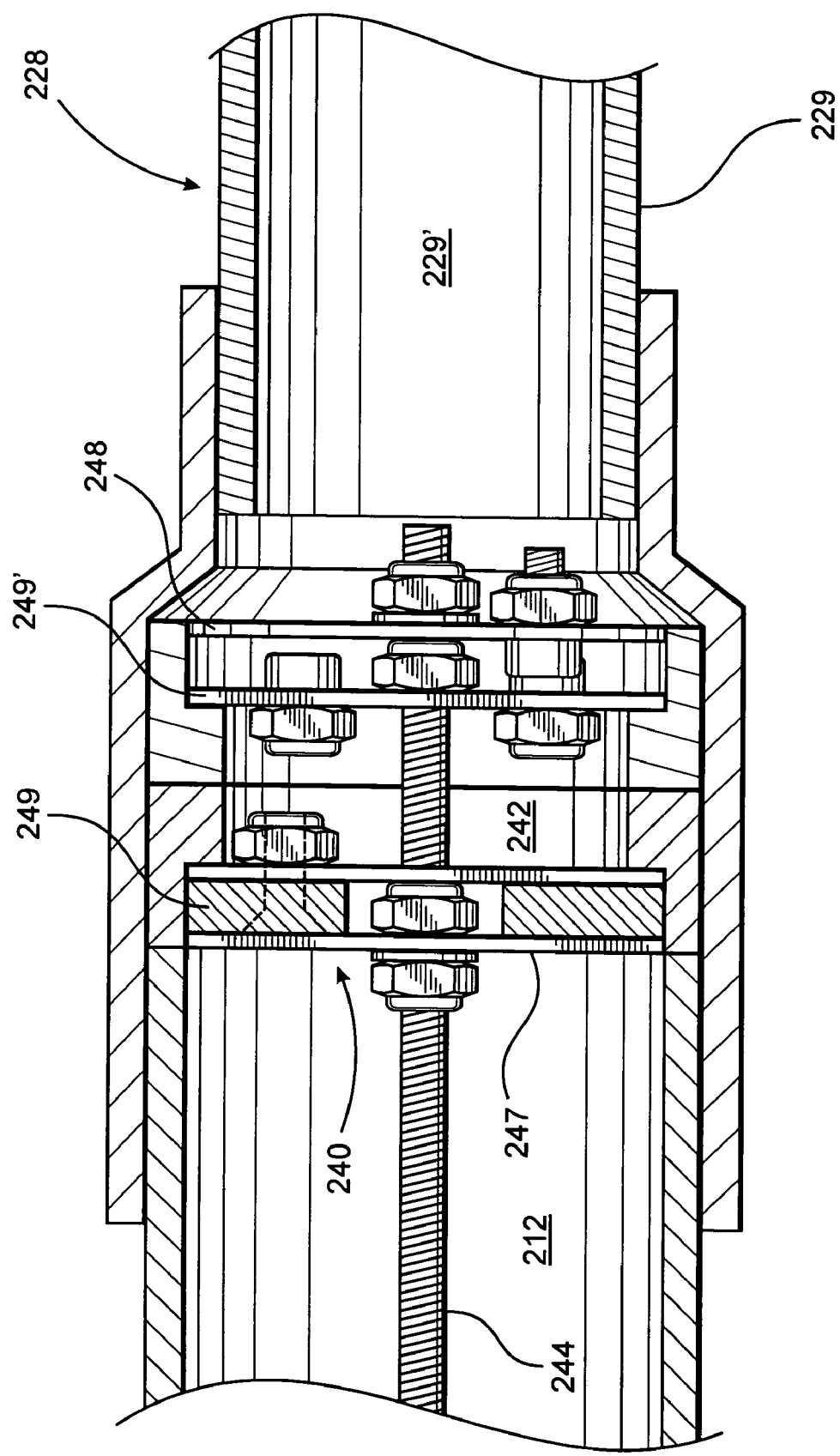
FIG. 22 is an interior sectional view showing structural details of a regulator assembly associated with the applicator assembly of the preferred embodiment of FIGS. 17-21.
Figure 23:
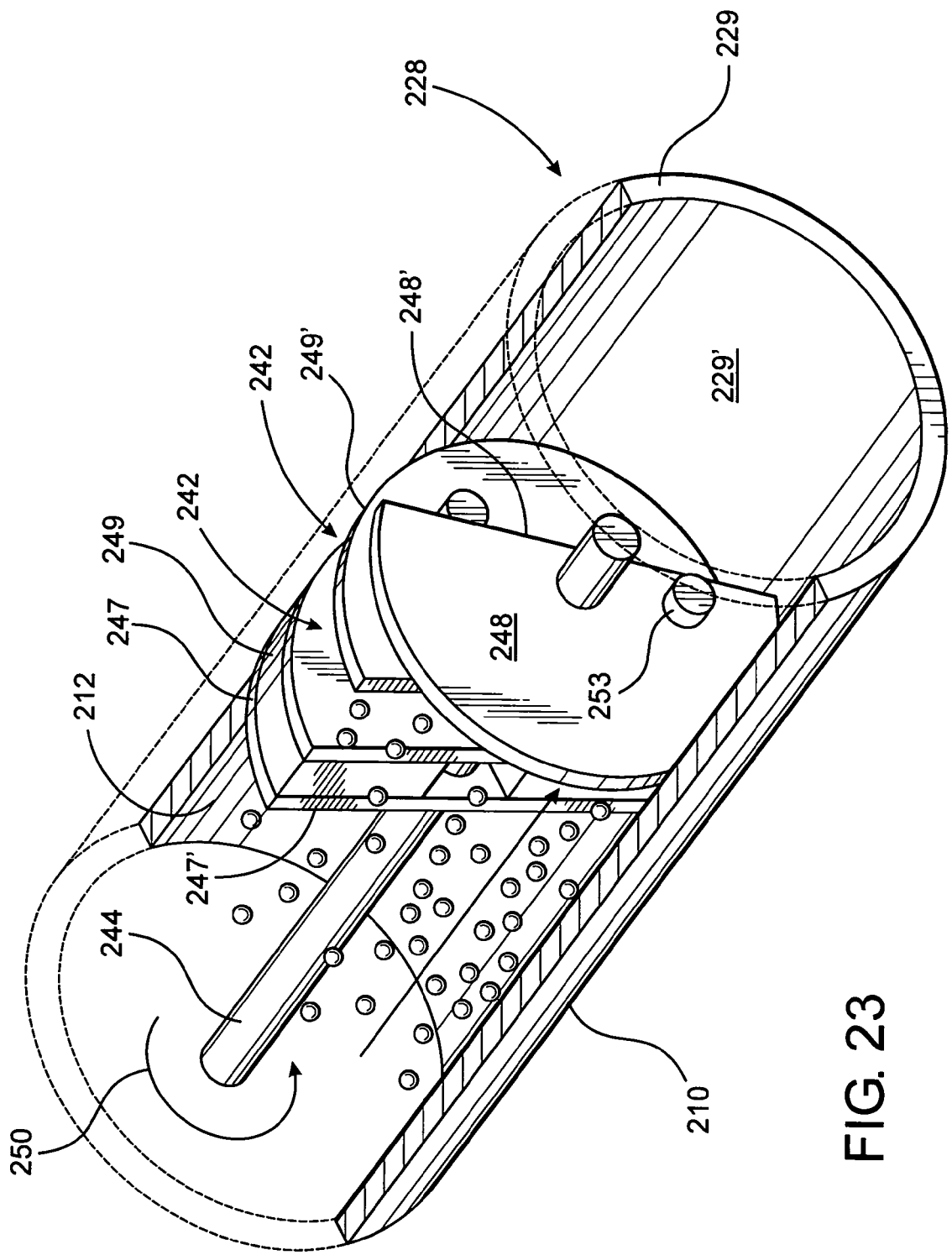
FIG. 23 is a perspective view in partial cutaway, section and phantom, disclosing operative and structural components of the regulator assembly of the embodiment of FIG. 22.
Figure 24:
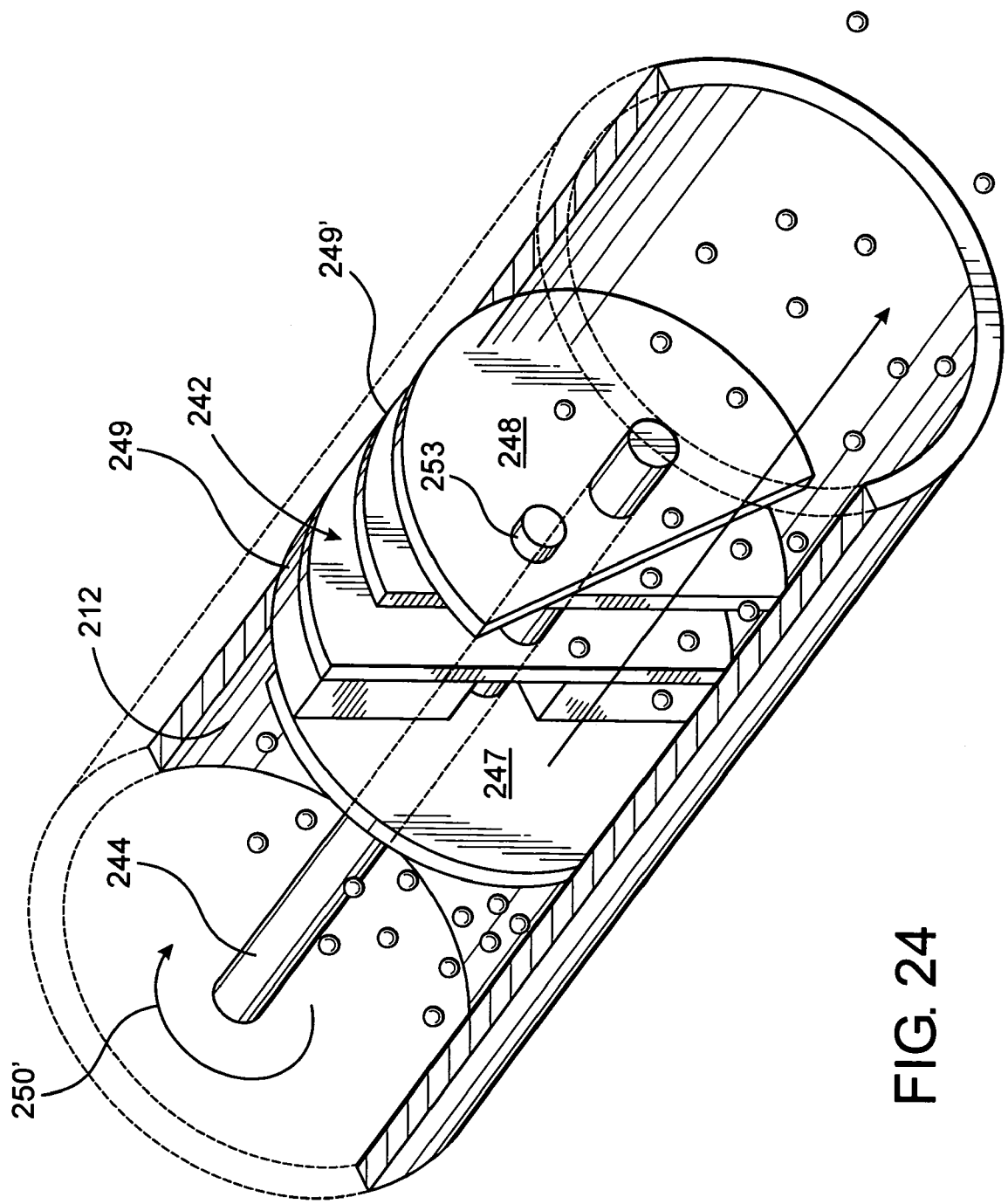
FIG. 24 is a perspective view in partial cutaway, section and phantom, showing additional operative details of the regulator assembly of the embodiment of FIGS. 22 and 23.

Yet another preferred embodiment of the present invention includes the applicator assembly generally indicated as 200 in FIGS. 17-25. The applicator assembly 200 includes an applicator 210 having a housing which includes a hollow interior 212. In addition, the applicator 210 includes an inlet assembly generally indicated as 214 and a discharge assembly generally indicated as 215. As best shown in FIG. 21, the discharge assembly 215 may include any one of a plurality of different size nozzles 216, of the type described above with reference to FIG. 16 and as will be hereinafter with particular reference to FIGS. 25, 25A-25D.

Figure 25:
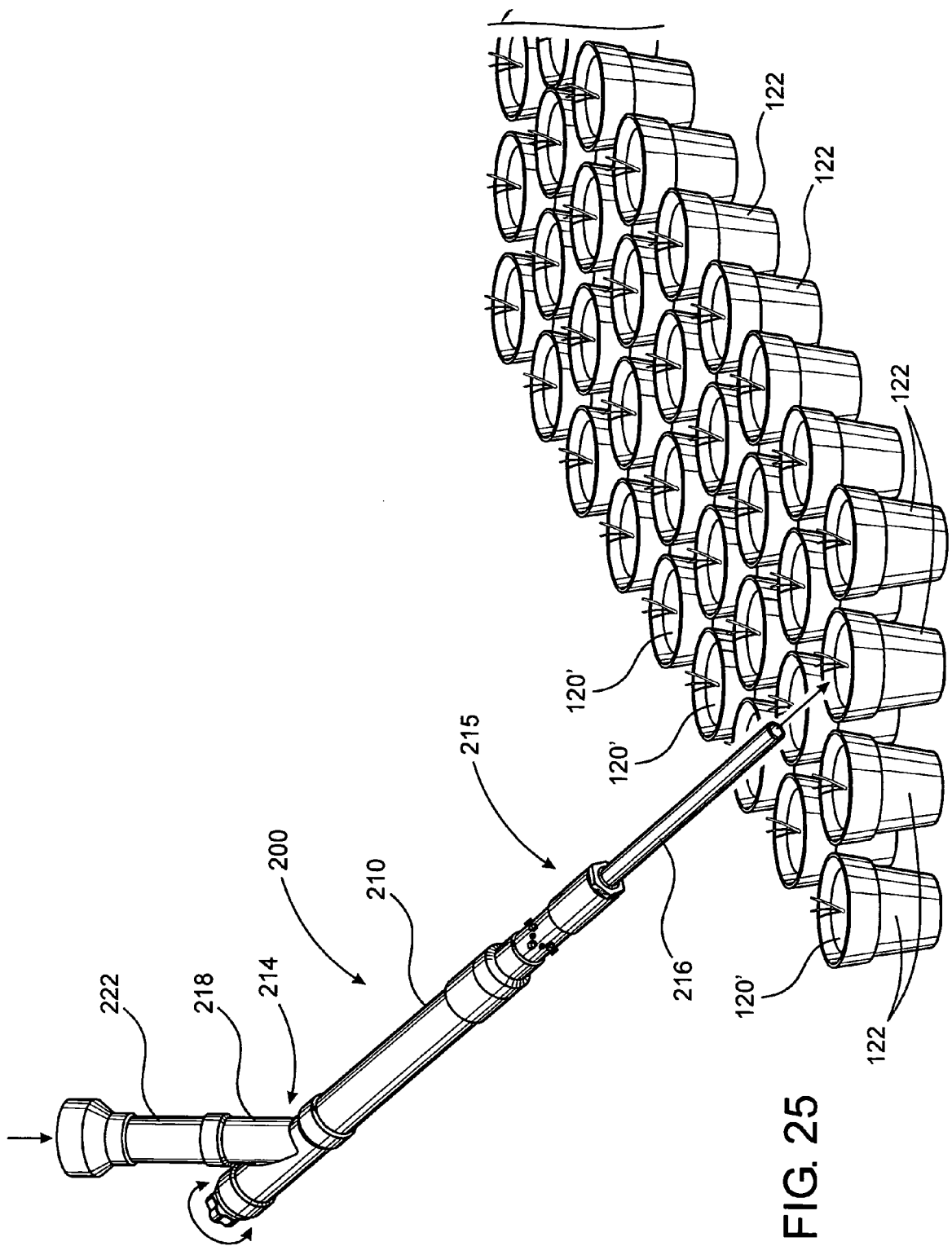
FIG. 25 is the applicator assembly of the embodiment of FIGS. 17-24 shown in an operative position oriented to effectively deliver particulate material to predetermined areas of reduced size such as, but not limited to, root zones of a plants.
Figure 25A:
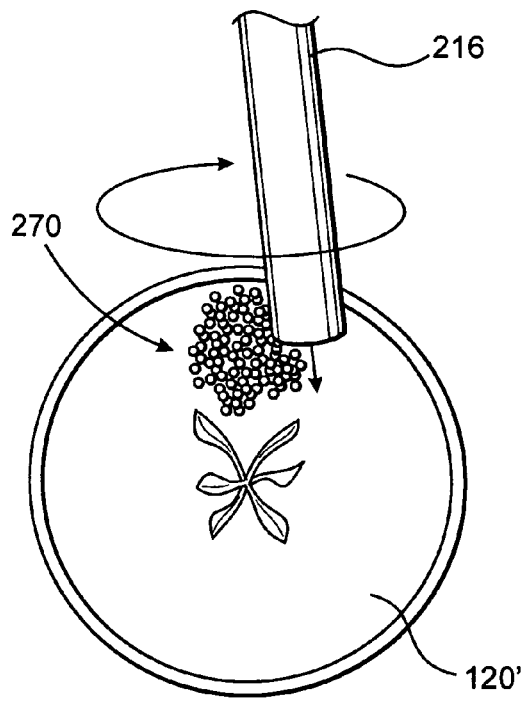
FIGS. 25A-25D are schematic representations of delivery patterns of particulate material to predetermined areas of reduced size, including root zones of plants.
Figure 25B:
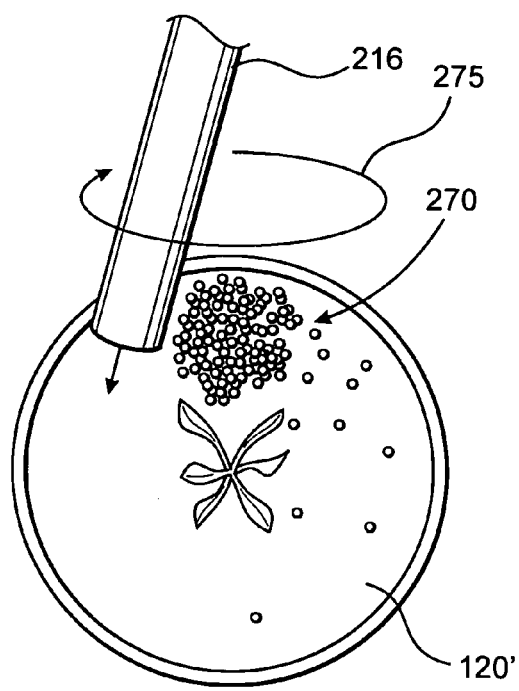
Figure 25C:
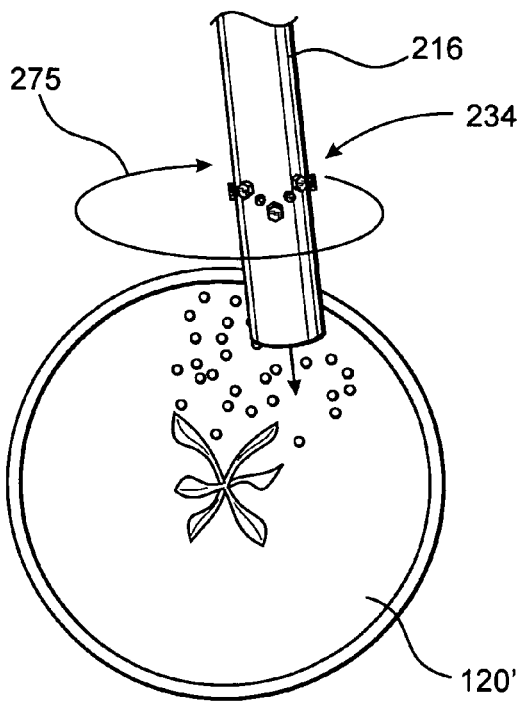
Figure 25D:
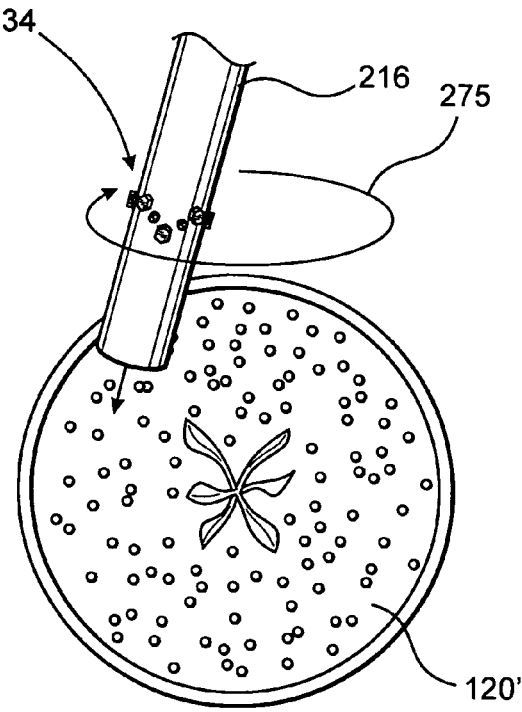

The applicator 210 is preferably of substantially lightweight construction being formed of a plastic or other durable material and is dimensioned and configured to be carried by or otherwise supported on the person of a user. As also will be explained in greater detail hereinafter, the applicator assembly 200 is intended to be carried in an operative position as generally represented in FIG. 25. Such operative position may be generally defined as a substantially upright, at least partially vertical and at least partially angular orientation. In that the particulate material is discharged from the applicator 210 because of the force of gravity thereon, such an operative position facilitates the accurate and precise delivery of the particles to one or more root zones 120' of plants, whether the plants are grown in pots 122 or in the ground.

Figure 2:
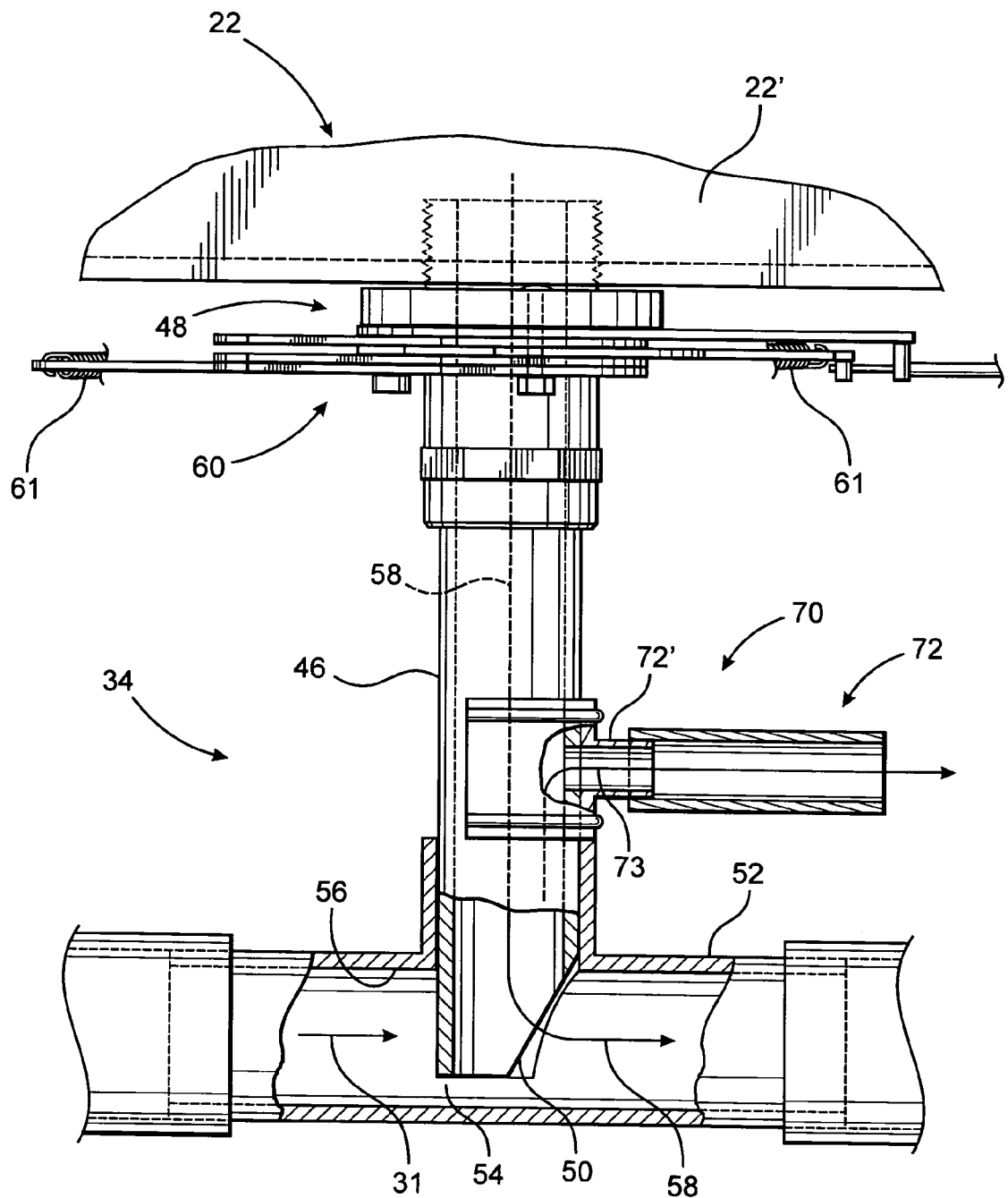
FIG. 2 is a detailed view of a manifold assembly associated with the preferred embodiment of FIG. 1.

Accordingly, the applicator assembly 200 is specifically intended to be used for the precise and accurate distribution of particulate material to predetermined areas of reduced size, such as root zones 120' and even more particularly wherein such predetermined areas or root zones 120' are of a significantly smaller size than that depicted and represented in FIG. 16. As set forth above, the precise distribution of fertilizer or other particulate material, in an intended pattern, to very small predetermined areas is a longstanding problem. In order to prevent the afore-mentioned bouncing or ricocheting of such particulate material, the velocity of the particulate material must be significantly reduced. Therefore the applicator assembly 200 of the present invention is specifically structured to be used without the forced flow of air or air stream created by the blower assembly 26 in the embodiment of FIGS. 1 and 2.

To the contrary, the applicator assembly 200 is structured to discharge the particulate material from the applicator 210 by means of gravity flow. As such, the positioning of the applicator assembly 200 in the afore-mentioned operative position is important at least to the extent that the particulate material easily flows from the discharge assembly 215 due to the force of gravity exerted thereon. It is emphasized that the operative position of the applicator assembly 200 may vary from that represented in FIG. 25. While a true vertical position is not required to accomplish the reliable flow of particulate material from the discharge assembly 215, the operative position may be defined by an at least partially vertical/angularly oriented position, wherein the discharge assembly 215 is substantially lower than the inlet assembly 214 such as demonstrated in FIG. 25.

The interior 212 of the applicator 210 being hollow along at least a majority or substantially its entire length, facilitates its use a storage chamber or area for the particulate material. The inlet assembly 214 includes a fill segment 218 having an open end 220 through which the particulate material may be introduced into the hollow interior 212. Alternatively, an inlet extension generally indicated as 222 may be removably or fixedly connected to the inlet assembly 214 such as by being extended outwardly from the fill segment 218 as represented in FIGS. 17-21.

In addition, the inlet extension 222 may have an adaptor as at 223 secured to an outermost end thereof. The adaptor 223 may be specifically dimensioned, configured and structured to receive the end 38 of the discharge nozzle 36 described with reference to FIGS. 1-4. Connection of the fill extension 222 to the discharge conduit 36 facilitates a rapid filling of the hollow interior 212 as the particulate material is forced therein by the air stream generated by the blower assembly 26. However, once the interior is filled, the conduit 36 is removed from the applicator assembly 200. Clearly, filling of the hollow interior 212 with the particulate material may also be done manually through either open end 220 of the fill segment 218 or the adaptor 223, as preferred. Of course, the interiors of the fill segment 218 and the fill extension 222 communicate directly with each other and the hollow interior 212. Therefore the fill segment 218 and/or the fill extension 222 may also serve as additional storage for the particulate material in order to increase the capacity of the applicator assembly 200 and thereby reduce the frequency of refilling the interior 212 during extended use of the applicator assembly 200.

The applicator assembly 200 also includes a material flow path 228 generally extending from a distal end 230 of the hollow interior 212 to the discharge assembly 215. As such, the material flow path 228 is in receiving relation to the particulate material within the hollow interior 212. The material flow path is more specifically defined by the applicator segment 229 and the interior passage 229' thereof. The passage 229' of the material flow path 228 is disposed and structured to direct or channel the particulate material from the hollow interior 212 to the discharge assembly 215. The particulate material then exits the applicator assembly 200 from the discharge assembly 215 and nozzle 216, under gravity flow, and is delivered individually to the predetermined areas of reduced size including, but not limited to, the root zones 120', as represented in FIG. 25.

It is again emphasized that in order to precisely and accurately deliver the particulate material in a preferred, distributed pattern over the root zone 120', it is necessary to significantly reduce its velocity as it exits the applicator assembly 200 as through the discharge assembly 215. As described, the applicator assembly 200 does not utilize a forced flow of air, as from a blower 26. However, the force of gravity exerted on the particles when the applicator assembly 200 is in the operative position, is still sufficient to increase the velocity of the particles as they exit the nozzle 216. This velocity is sufficient to cause ricocheting of the particles from the root zone 120' and/or prevent the patterned distribution of the particles over the root zone 120', as will be explained with reference to FIGS. 25A through 25B. Accordingly, another structural features of the applicator assembly 200 includes a diffuser assembly generally indicated as 234.

While a variety of different diffuser assemblies may be used, a most preferred embodiment of the applicator assembly 200 comprises a substantially equivalent structure to the diffuser assembly 140 represented in FIGS. 7 and 8. As such, the diffuser assembly 234 preferably comprises a plurality of fingers movably connected to the material flow path segment 229 so as to be selectively adjustable inwardly and outwardly relative to the passage 229' of the material flow path 228. The plurality of variably adjustable fingers are therefore selectively disposed into interruptive relation to the particles of the material as they pass along the material flow path 228 and prior to their reaching the downstream location of the discharge assembly 215. The existence of the diffuser assembly 234 significantly reduces the velocity of the particles dispensed to the point where bouncing or ricocheting from the significantly smaller root zones or other predetermined areas of reduced size 120' is eliminated or significantly reduced.

It should be apparent that when delivering fertilizer or other particulate material to a specific predetermined area, of reduced size, it is important to distribute a proper quantity of such material. Accordingly, an additional structural and operational features of the applicator assembly 200 includes a regulator assembly generally indicated as 240 and shown in detail in FIGS. 22-24. The regulator assembly 240 preferably comprises a chamber 242 which may be removably connected to the applicator assembly 200. As such, the regulator assembly can be easily replaced by chambers of different sizes and capacities.

The regulator assembly 240, and in particular the measuring chamber 242 is movably mounted on the interior of the applicator 210 in communicating, flow regulating relation between the material flow path 228 and the hollow interior 212 of the applicator 210. The regulator assembly 240 is selectively positionable on the interior of the applicator 210 by means of an operator assembly including exteriorly mounted, user accessible knob or handle 243 connected to an elongated positioning rod 244. The rod 244 extends along the entire length of the applicator 210 and within the hollow interior 212 as depicted. The distal end of the rod 244, oppositely disposed to the handle 242, is fixedly connected to baffle plates 247 and 248 which are a part of and at least partially define the capacity of the measuring chamber 242.

Each of the baffle plates 247 and 248 are configured to include an open or cutaway section as at 247' and 248' respectively, which are off-set or non-aligned with one another. Selective rotation of the rod 244 in opposite, clockwise/counter-clockwise directions, as schematically indicated by the directional arrows 250 and 250', serves to selectively position the chamber 242 between a filling position and an emptying position. Accordingly, an operator may turn the handle 243 and thereby alternately position the chamber 242, in a receiving orientation relative to the hollow interior 212, and in a delivering orientation relative to the material flow path 228. More specifically, rotation of the handle 243 causes rotation of the rod 244 and concurrent rotation of both the baffle plates 247 and 248. When properly rotated the baffle plate 247 has its cutaway opening 247' oriented such that the particles (see FIG. 23) flow into the interior of the measuring chamber 242 but are prevented from passing beyond the baffle plate 248 to the material flow path. However, rotation of the rod 244 in the opposite direction, (see FIG. 24), causes the baffle plate 247 to block the flow of particulate material from the hollow interior 212 into the measuring chamber 242. Concurrently, the rotation in accordance with directional arrow 250' of FIG. 24 "opens" the baffle plate 248 thereby allowing the particulate material to flow from the measuring chamber 242 into the material flow path 228 and along the interior 229' of the segment 229.

The particulate material released from the measuring chamber 242 engages the aforementioned diffuser assembly 234 whereat the velocity of the particulate material is additionally slowed. The regulator assembly 240 further includes spacers 249 and/or mounting plates 249' for purposes of stability and to facilitate the firm connection of the rotatable baffle plates 247 and 248 by connectors or other appropriate means. As shown in FIG. 24, stop members 253 may also be provided on one or both of the baffle plates 247 and 248 for purposes of limiting the rotation of the respective baffle plats 247 and 248 and to facilitate the proper and accurate positioning thereof. As should also be apparent, the receiving and delivering orientations are respectively defined by the measuring chamber being disposed in a filling position relative to the interior 212 and an emptying position relative to the material flow path 228.

With primary reference to FIGS. 25 and 25A 25D, operative features of the applicator assembly 200 and the importance of it being structured to reduce the velocity of the particulate material exiting therefrom is schematically demonstrated. More specifically, when the applicator assembly 200 is disposed in the operative position of FIG. 25, such as by being carried or supported by an operator or user, the nozzle 216 or other appropriate portion of the discharge assembly 215 is directed or "aimed" at each of one or more root zones 120' or other predetermined areas of reduced size. As demonstrated in FIGS. 25A and 25B if the particulate material is traveling at too great a velocity such as due to the absence of the diffuser assembly 234, or for other structural or operational reasons, such material will either bounce or ricochet off of the exposed surface of the root zone 120' or otherwise be concentrated in an undistributed mass 270. The mass of particulate material 270 would be essentially concentrated in a relatively small exposed area of the root zone 120' even if the operator of the applicator assembly 200 would attempt to distribute the particulate material over substantially the entire exposed area of the root zone 120' by manipulation of the nozzle 216 schematically demonstrated by the directional arrows 275.

It is well known in the agricultural area that in order to obtain maximum benefits from fertilization, using particulate material, it is necessary spread or distribute the particulate material substantially over the entire exposed area of the root zone as schematically represented in FIG. 25D. However, reducing the velocity of the particulate material as it exits through the discharge assembly 215 and nozzle 216 will allow the operator to manipulate the applicator assembly 200 and the nozzle 216 in accordance with the directional arrows 275 so as to accomplish a desired and intended distribution pattern. The patterned distribution of the particulate material is schematically represented of FIG. 25C, as the predetermined quantity of particles begin to reach the root zone 120' and culminate in the preferred distribution pattern of the particulate material schematically represented in FIG. 25D.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. An assembly structured to distribute particulate material, said assembly comprising:
   a) a blower assembly structured to generate a forced flow of air along a predetermined flow path,
   b) a manifold assembly including a delivery conduit disposed and structured to channel material from a material supply to said predetermined flow path,
   c) said predetermined flow path at least partially defined by a discharge conduit connected to said manifold assembly downstream thereof,
   d) a vent assembly comprising a continuously open vent connected to said manifold assembly and disposed and structured to vent back pressure from said predetermined flow path to an exterior of said manifold assembly,
   e) said continuously open vent comprising a vent conduit connected to said delivery conduit and disposed in fluid communication with an interior of said delivery conduit and atmosphere on an exterior of said manifold assembly, and
   f) a valve assembly disposed between said delivery conduit and the material supply and structured to regulate material flow to said manifold assembly through said delivery conduit.

2. An assembly as recited in claim 1 further comprising a mobile platform including the material supply mounted thereon, said blower assembly mounted on said mobile platform.

3. An assembly as recited in claim 2 wherein said mobile platform is manually powered.

4. An assembly as recited in claim 2 wherein said mobile platform comprises a motorized vehicle.

5. An assembly as recited in claim 1 wherein said blower assembly is removably mounted on a mobile platform.

\* \* \* \* \*